(12) United States Patent
Cheng et al.

(10) Patent No.: US 12,260,143 B2
(45) Date of Patent: Mar. 25, 2025

(54) SENSOR-BASED SCREEN-ON CONTROL METHOD AND ELECTRONIC DEVICE

(71) Applicant: Huawei Technologies Co., Ltd., Shenzhen (CN)

(72) Inventors: Jing Cheng, Wuhan (CN); Qi Sun, Shenzhen (CN); Huajian Tian, Lima (PE); Xiaoxiao Chen, Nanjing (CN); Qingyu Cui, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 17/859,493

(22) Filed: Jul. 7, 2022

(65) Prior Publication Data

US 2022/0398057 A1   Dec. 15, 2022

Related U.S. Application Data

(63) Continuation of application No. PCT/CN2021/070861, filed on Jan. 8, 2021.

(30) Foreign Application Priority Data

Jan. 8, 2020   (CN) .................. 202010017007.X

(51) Int. Cl.
*G06F 3/14*   (2006.01)
*H04M 1/02*   (2006.01)
(Continued)

(52) U.S. Cl.
CPC ........ *G06F 3/1423* (2013.01); *H04M 1/0216* (2013.01); *H04M 1/0268* (2013.01); *G06F 3/0346* (2013.01); *G06F 3/044* (2013.01)

(58) Field of Classification Search
CPC ...... G06F 3/1423; G06F 3/0346; G06F 3/044; G06F 1/1641; G06F 1/3218;
(Continued)

(56) References Cited

U.S. PATENT DOCUMENTS

2010/0302179 A1* 12/2010 Ahn ................... H04M 1/72403
                                                                345/173
2013/0021265 A1*  1/2013 Selim ................... G06F 3/04883
                                                                345/173
(Continued)

FOREIGN PATENT DOCUMENTS

CN    106155325 A    11/2016
CN    107563174 A     1/2018
(Continued)

*Primary Examiner* — David D Davis
(74) *Attorney, Agent, or Firm* — Conley Rose, P.C.

(57) ABSTRACT

An electronic device includes a first screen and a second screen. A high-power sensor of the electronic device is in a disabled state, and a low-power sensor of the electronic device is in an enabled state. The electronic device includes a foldable device. Based on this, after the electronic device receives a screen-on trigger signal from the low-power sensor or a processor of the electronic device, the electronic device determines a to-be-lit-up first target screen based on the screen-on trigger signal, and then controls the first target screen to be lit up.

20 Claims, 13 Drawing Sheets

(51) Int. Cl.
*G06F 3/0346* (2013.01)
*G06F 3/044* (2006.01)

(58) Field of Classification Search
CPC ............. H04M 1/0216; H04M 1/0268; H04M 2250/16; H04M 1/0214; H04M 1/0243; H04M 1/72454; H04W 52/0254; H04W 52/028; Y02D 30/70
See application file for complete search history.

(56) References Cited

U.S. PATENT DOCUMENTS

| | | | | |
|---|---|---|---|---|
| 2014/0218321 | A1* | 8/2014 | Lee | G06F 1/1652 |
| | | | | 345/173 |
| 2017/0052566 | A1* | 2/2017 | Ka | G09G 3/035 |
| 2017/0090681 | A1* | 3/2017 | Gao | H04M 1/0268 |
| 2017/0345397 | A1* | 11/2017 | Tsukamoto | G06F 3/04845 |
| 2021/0389873 | A1 | 12/2021 | Chen et al. | |

FOREIGN PATENT DOCUMENTS

| | | |
|---|---|---|
| CN | 107765775 A | 3/2018 |
| CN | 108989552 A | 12/2018 |
| CN | 109739430 A | 5/2019 |
| CN | 109840061 A | 6/2019 |
| CN | 109901767 A | 6/2019 |
| CN | 109917956 A | 6/2019 |
| CN | 109922202 A | 6/2019 |
| CN | 109933196 A | 6/2019 |
| CN | 109981839 A | 7/2019 |
| CN | 110536004 A | 12/2019 |
| CN | 111262975 A | 6/2020 |
| EP | 3525075 A1 | 8/2019 |
| WO | 2019015088 A1 | 1/2019 |

* cited by examiner

SENSOR-BASED SCREEN-ON CONTROL METHOD AND ELECTRONIC DEVICE

CROSS-REFERENCE TO RELATED APPLICATIONS

This is a continuation of International Patent Application No. PCT/CN2021/070861 filed on Jan. 8, 2021, which claims priority to Chinese Patent Application No. 202010017007.X filed on Jan. 8, 2020. The disclosures of the aforementioned applications are hereby incorporated by reference in their entireties.

TECHNICAL FIELD

This disclosure relates to the field of terminal artificial intelligence (AI) technologies, and in particular, to a screen-on control method and an electronic device.

BACKGROUND

With development of technologies, intelligent devices having a plurality of screens (or multi-screen devices) emerge. For example, FIG. 1A shows a foldable mobile phone including a first screen and a second screen. A folding process and an unfolding process of the foldable mobile phone are shown in FIG. 1B. As shown in FIG. 1C, if the foldable mobile phone is unfolded, so that screens of the foldable mobile phone form a plane, the foldable mobile phone needs to control both the first screen and the second screen to be in a screen-on state. As shown in FIG. 1D, if the foldable mobile phone is folded, and the first screen is kept facing a user, the foldable mobile phone needs to control the first screen to be in a screen-on state, and control the second screen to be in a screen-off state. As shown in FIG. 1E, if the foldable mobile phone is folded, and the second screen is kept facing the user, the foldable mobile phone needs to control the second screen to be in a screen-on state, and control the first screen to be in a screen-off state.

It can be learned that, as application scenarios change, a screen of the multi-screen device that needs to be lit up needs to change accordingly. How to control, accurately and in time, a screen that adapts to the application scenario to be lit up is an urgent problem to be resolved in the art.

SUMMARY

Embodiments of this disclosure provide a screen-on control method and an electronic device, to control, accurately and in time, a screen that adapts to an application scenario to be lit up.

According to a first aspect, an embodiment of this disclosure provides a screen-on control method, applied to an electronic device, where the electronic device includes a first screen and a second screen, a high-power sensor of the electronic device is in a disabled state, a low-power sensor of the electronic device is in an enabled state, the high-power sensor includes a sensor configured to detect a posture of the electronic device, and the low-power sensor includes a sensor configured to detect a screen-on trigger signal. The method includes receiving a screen-on trigger signal, where the screen-on trigger signal is from the low-power sensor or a processor of the electronic device, determining a to-be-lit-up first target screen based on the screen-on trigger signal, where the first target screen is the first screen, the second screen, or a screen obtained by combining the first screen and the second screen, and controlling the first target screen to be lit up.

Sensors of the electronic device may be classified into the high-power sensor and the low-power sensor based on resources consumed in a working process. The high-power sensor is a sensor that detects the posture of the electronic device at a preset frequency regardless of whether the electronic device receives the screen-on trigger signal. The low-power sensor is a sensor that detects the screen-on trigger signal of the electronic device. The electronic device related to this disclosure includes the first screen and the second screen. Based on this, to reduce power consumption, when each screen of the electronic device is in a screen-off state, the electronic device may control the high-power sensor to be disabled. Further, after receiving the screen-on trigger signal from the low-power sensor or a system module (for example, a communications module) of the electronic device, the electronic device may determine a to-be-lit-up screen based on the screen-on trigger signal, and then control a corresponding screen to be lit up. In this way, duration from a moment for receiving the screen-on trigger signal to a moment for controlling the screen to be lit up is relatively short, and a user is almost unaware of the duration. Therefore, user experience can be improved.

In a possible design, after receiving a screen-on trigger signal, the method further includes enabling the high-power sensor. In this way, subsequent posture change detection of the electronic device can be ensured. After controlling the first target screen to be lit up, the method further includes determining a posture of the electronic device based on sensor data determined by the high-power sensor. The sensor data determined by the high-power sensor includes increments of the first screen in three directions X, Y, and Z, increments of the second screen in the three directions X, Y, and Z, or an angle between the first screen and the second screen. The method further includes determining a to-be-lit-up second target screen based on the posture, where the second target screen is the first screen, the second screen, or a screen obtained by combining the first screen and the second screen. If the second target screen is different from the first target screen, switching a to-be-lit-up screen from the first target screen to the second target screen, or if the second target screen is the same as the first target screen, the method further includes keeping a screen that is currently lit up in an on state.

The screen-on trigger signal provides a limited amount of data, and the user may change a posture of the electronic device. Therefore, the first target screen may not be a screen that the user expects to be lit up. Based on this, after enabling the high-power sensor, the electronic device may obtain the posture of the electronic device by using the high-power sensor, then determine a to-be-lit-up screen based on the posture, to obtain the second target screen, and further determine whether the second target screen is the same as the first target screen. If the second target screen is different from the first target screen, it indicates that the first target screen is not a screen that the user expects to be lit up, and the electronic device switches the lit-up screen from the first target screen to the second target screen. Likewise, if the second target screen is the same as the first target screen, it indicates that the first target screen is the screen that the user expects to be lit up, and the electronic device keeps the first target in an on state. In this implementation, after controlling the first target screen to be lit up, the electronic device can further correct the lit-up screen in time based on the posture detected by the high-power sensor, to accurately control a screen that matches a user operation to be lit up.

In a possible design, determining a to-be-lit-up first target screen based on the screen-on trigger signal includes determining, based on orientation data of the first screen and orientation data of the second screen, that a screen facing the user is the first target screen. According to the technical solution in embodiments of this disclosure, after the user holds the electronic device with a hand and raises the hand, the low-power sensor may detect the orientation data of the first screen and the orientation data of the second screen of the electronic device. Then, the electronic device may determine the screen facing the user based on the orientation data of the first screen and the orientation data of the second screen, and determine that the screen facing the user is the first target screen. In this way, when the high-power sensor is disabled, the electronic device can quickly light up the screen in response to the hand raising operation of the user.

In a possible design, determining a to-be-lit-up first target screen based on the screen-on trigger signal includes determining relative locations of the first screen and the second screen based on magnetometer data, and determining a status of the electronic device based on the relative locations. When the status of the electronic device is an unfolded state, determining a to-be-lit-up first target screen includes determining that a screen obtained by combining the first screen and the second screen is the first target screen. Alternatively, when the status of the electronic device is a folded state, determining a to-be-lit-up first target screen includes determining that the first screen is the first target screen. In the technical solution of embodiments of this disclosure, for example, when receiving a power button touch instruction, a Universal Serial Bus (USB) interface connection or disconnection signal, or a communications signal, the low-power sensor may detect the magnetometer data of an electronic device, and then the electronic device determines the status of the electronic device based on the magnetometer data. When the status of the electronic device is an unfolded state, the electronic device determines, for example, that the first target screen is a screen obtained by combining the first screen and the second screen. When the status of the electronic device is a folded state, the electronic device determines, for example, that the first screen or the second screen is the first target screen. In this way, when the high-power sensor is disabled, the electronic device can control the screen that matches the screen-on trigger signal to be lit up quickly.

In a possible design, when the status of the electronic device is a folded state, determining a to-be-lit-up first target screen based on the screen-on trigger signal further includes determining that a screen indicated by location data is the first target screen. In the technical solution of embodiments of this disclosure, for example, after receiving a double-tap operation instruction or a fingerprint unlock instruction of the user, the low-power sensor may detect location data corresponding to user trigger. Further, when the status of the electronic device is an unfolded state, the electronic device controls the first screen and the second screen to be lit up. When the status of the electronic device is a folded state, the electronic device controls a screen indicated by the location data to be lit up. In this way, when the high-power sensor is disabled, the electronic device can control the screen that matches the screen-on trigger signal to be lit up quickly.

In a possible design, the posture is at least one of the following: unfolded, folded, placed with the first screen facing a user, placed with the second screen facing the user, held with the first screen facing the user, and held with the second screen facing the user. It can be learned that the posture of the electronic device can indicate the status of the electronic device in more detail and more accurately, and even can indicate a status of holding the electronic device by the user. Based on this, the electronic device can accurately determine the to-be-lit-up screen based on the posture, to ensure accuracy of the to-be-lit-up second target screen.

In a possible design, determining a posture of the electronic device based on the sensor data determined by the high-power sensor includes determining an initial posture of the electronic device based on the sensor data determined by the high-power sensor, where the initial posture is at least one of the following: unfolded, folded, placed with the first screen facing the user, and placed with the second screen facing the user, and determining the posture based on the initial posture and a user contact status, where the user contact status is determined by the low-power sensor, and the user contact status is at least one of the following: contacting the first screen and contacting the second screen. It can be learned that in embodiments of this disclosure, the electronic device fuses the posture of the electronic device and the posture that the user contacts the electronic device, to obtain a final posture of the electronic device. It can be learned that the posture of the electronic device can reflect both a status of the electronic device and a status of holding the electronic device by the user. Based on this, the electronic device can accurately determine the to-be-lit-up screen based on the posture, to ensure accuracy of the to-be-lit-up second target screen.

In a possible design, determining a to-be-lit-up second target screen based on the posture includes determining at least one posture of the electronic device, detecting a quantity of consecutive occurrences of a same posture in the at least one posture, and when the quantity of consecutive occurrences of the same posture is greater than half of a total quantity of the at least one posture, determining the second target screen based on the same posture. In embodiments, the electronic device may determine the second target screen based on a plurality of postures of the electronic device, so that the second target screen can be accurately determined, and an intelligence degree is high.

According to a second aspect, an embodiment of this disclosure provides an electronic device, and the electronic device has a function of implementing the foregoing method. The function may be implemented by hardware, or may be implemented by executing corresponding software by hardware. The hardware or the software includes one or more modules corresponding to the foregoing function. In a possible design, a structure of the electronic device includes a processor, a receiver, and a display, and the display screen includes a first screen and a second screen. The processor is configured to process the electronic device to perform a corresponding function in the foregoing method, to control at least one of the first screen or the second screen to be lit up. The receiver is configured to receive a screen-on trigger signal. The electronic device further includes a high-power sensor and a low-power sensor, where the high-power sensor includes a sensor configured to detect a posture of the electronic device. The low-power sensor includes a sensor configured to detect a screen-on trigger signal. The electronic device may further include a memory. The memory is configured to be coupled to the processor, and the memory stores program instructions and data that are necessary for the electronic device.

According to a third aspect, an embodiment of this disclosure provides a computer storage medium. The computer storage medium stores instructions. When the instructions are run on a computer, the computer performs some or all steps of the screen-on control method in the first aspect and the various possible implementations of the first aspect.

According to a fourth aspect, an embodiment of this disclosure provides a computer program product. When the computer program product is run on a computer, the computer performs some or all steps of the screen-on control method in the first aspect and the various possible implementations of the first aspect.

To resolve a problem existing in an existing solution, in an electronic device in this disclosure, when a high-power sensor is disabled, a low-power sensor may detect a screen-on trigger signal. Then, the electronic device may determine a to-be-lit-up screen based on the screen-on trigger signal, and control the to-be-lit-up screen to be lit up, so that the screen can be lit up in time in response to the trigger. Further, after receiving the screen-on trigger signal, the electronic device may further enable the high-power sensor. Further, the electronic device may obtain a posture of the electronic device determined by the high-power sensor. Then, the electronic device verifies, based on the posture of the electronic device, whether the lit-up screen matches the screen-on trigger signal. If the lit-up screen does not match the screen-on trigger signal, the electronic device switches the lit-up screen to a screen that matches the screen-on trigger signal. It can be learned that in the implementations of this disclosure, when the high-power sensor is disabled, the electronic device can control the screen to be lit up in time in response to the screen-on trigger signal. Then, the electronic device can further correct the lit-up screen in time, so that it can be ensured that the screen that matches the screen-on trigger signal is lit up, and user experience can be improved.

BRIEF DESCRIPTION OF DRAWINGS

To describe the technical solutions in this disclosure more clearly, the following briefly describes the accompanying drawings used for describing some embodiments. Apparently, persons of ordinary skill in the art may derive other drawings from these accompanying drawings without creative efforts.

DESCRIPTION OF EMBODIMENTS

Figure 1A:
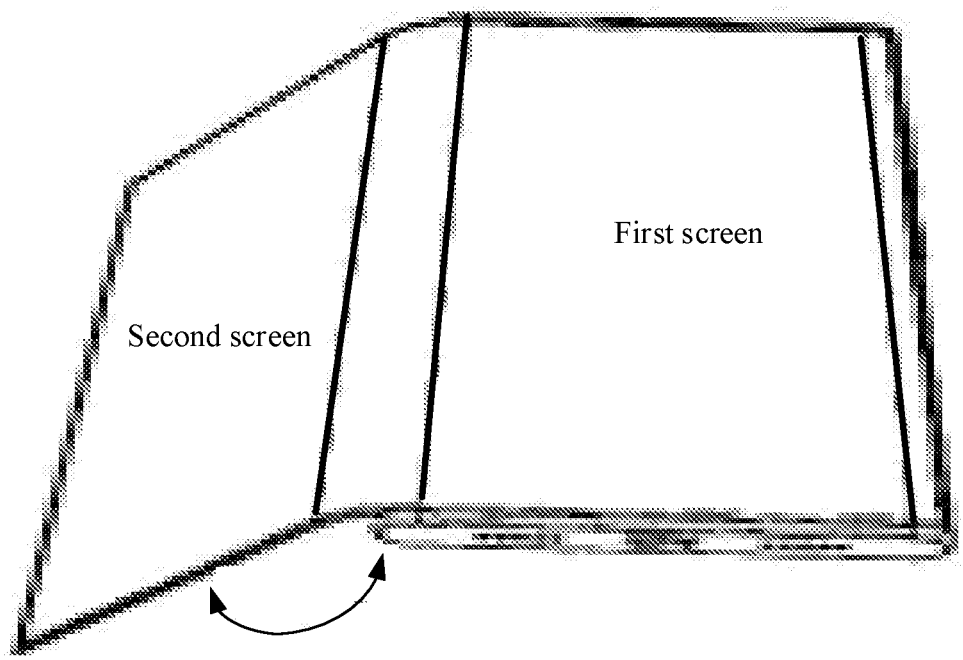
FIG. 1A is a schematic diagram of an example structure of a foldable mobile phone according to an embodiment of this disclosure.
Figure 1B:
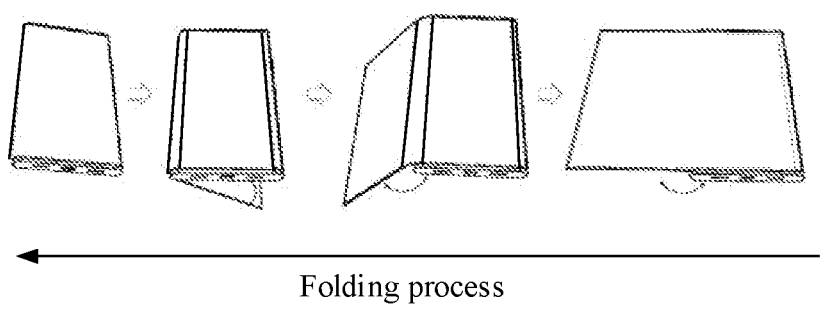
FIG. 1B is a schematic diagram of a folding process and an unfolding process of the foldable mobile phone shown in FIG. 1A.
Figure 1C:
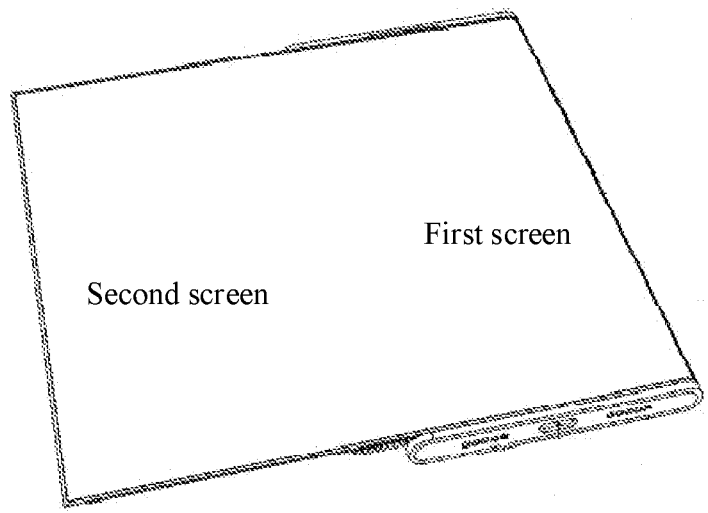
FIG. 1C is a schematic diagram of an example unfolding state of the foldable mobile phone shown in FIG. 1A.
Figure 1D:
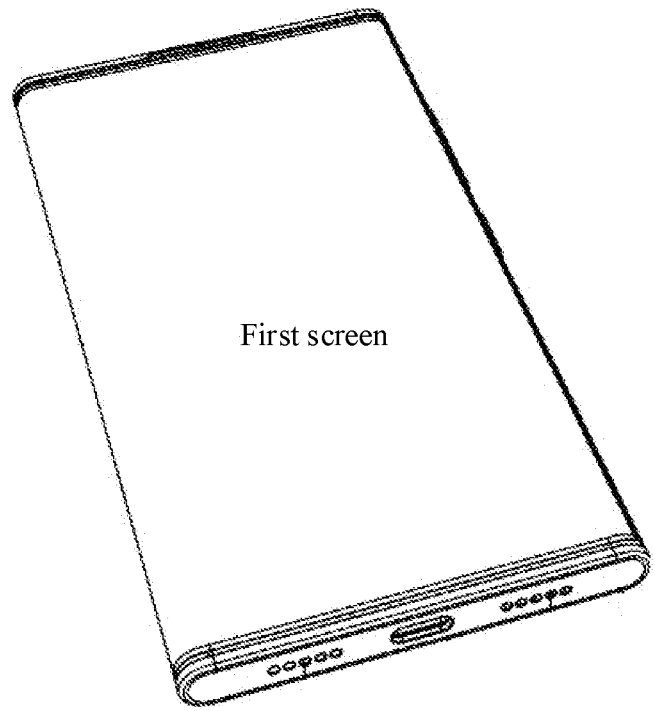
FIG. 1D is a schematic diagram of a first example folding state of the foldable mobile phone shown in FIG. 1A.
Figure 1E:
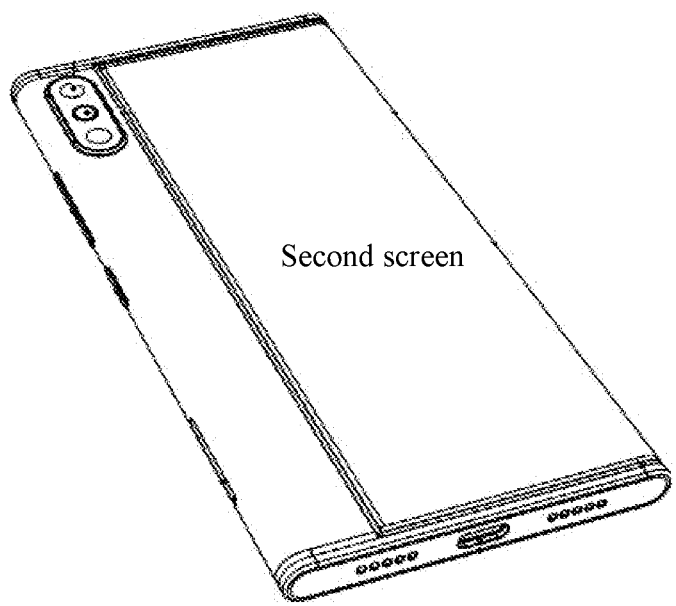
FIG. 1E is a schematic diagram of a second example folding state of the foldable mobile phone shown in FIG. 1A.

The following clearly describes a technical solution in this disclosure with reference to accompanying drawings in this disclosure.

Terms used in the following embodiments of this disclosure are only intended to describe particular embodiments, and are not intended to limit this disclosure. Terms "one", "a", "the", "the foregoing", "this", and "the one" of singular forms used in this specification and the appended claims of this disclosure are also intended to include plural forms, unless otherwise specified in the context clearly. It should also be understood that although the terms first, second, and the like may be used to describe a class of objects in the following embodiments, the objects should not be limited to these terms. The terms are merely used to distinguish between specific objects of this class of objects. For example, in the following embodiments, terms such as first and second may be used to describe screens, but the screens should not be limited to the terms. The terms are only used to distinguish different screens. The same applies to other classes of objects that may be described by using the terms first, second, and the like in the following embodiments. Details are not described herein again. In addition, the term "and/or" used in embodiments of this disclosure means and includes any or all possible combinations of one or more listed items.

The following embodiments describe an electronic device and embodiments of a screen-on control method applied to the electronic device.

The electronic device in embodiments of this disclosure is an electronic device including at least two screens, for example, a mobile phone or a tablet computer. In some embodiments, the electronic device includes at least two fixedly disposed screens. For example, the electronic device includes a fixedly disposed primary screen and a fixedly disposed side screen. In some other embodiments, the electronic device is a foldable device, and includes two structures that can be folded towards a peer end. For example, each of the two structures includes a screen. In still some other embodiments, the electronic device includes a flexible screen, and a status of the flexible screen may change with a folding state of the electronic device, to obtain at least two screens. In addition, example embodiments of the electronic device include but are not limited to carrying iOS®, Android®, Microsoft®, or another operating system.

Lighting up a screen in embodiments of this disclosure means that a light emitting component disposed on a back side of a screen facing a user is touched to emit light, and a color and brightness of the emitted light are set based on a program, so that the screen clearly presents each application (APP), information, an image, a video, or the like to the user.

Turning off a screen in embodiments of this disclosure means that all or some of light emitting components disposed on the back side of the screen facing the user are touched to be turned off, so that the screen presents only time or nothing.

The electronic device in embodiments of this disclosure may include a "high-power sensor" and a "low-power sensor". The "high-power sensor" includes a sensor configured to detect a posture of the electronic device. The "high-power" means that this type of sensor detects a posture of the electronic device at a preset frequency regardless of whether the electronic device receives a trigger signal. The high-power sensor includes but is not limited to an acceleration (ACC) sensor, a gyroscope sensor, and the like. The "low-power sensor" includes a sensor configured to detect a screen-on trigger signal. The "low-power" means that this type of sensor detects a screen-on trigger signal of the electronic device only after receiving a user trigger signal or a communications signal. The low-power sensor includes but is not limited to a touch sensor, a magnetometer sensor, an optical proximity sensor, and the like.

It should be understood that "high-power" and "low-power" are only terms defined based on a relative amount of resources consumed during operation of the sensors, and constitute no limitation on technical solutions in embodiments of this disclosure. All sensors that meet the foregoing descriptions of the characteristics of the "high-power sensor" in this field belong to the scope of the "high-power sensor" in embodiments of this disclosure. Similarly, all sensors that meet the foregoing descriptions of the characteristics of the "low-power sensor" in this field belong to the scope of the "low-power sensor" in embodiments of this disclosure.

In actual use, to reduce power consumption, for example, when each screen of the electronic device is in a screen-off state, the electronic device controls the high-power sensor to be disabled. Based on this, after receiving a screen-on trigger signal, the electronic device needs to first enable the high-power sensor. Further, the high-power sensor detects a posture of the electronic device. Then, the electronic device determines a to-be-lit-up screen based on the posture, and then the electronic device controls the determined screen to be lit up. A specific time period is occupied from enabling the high-power sensor to controlling the corresponding screen to be lit up by the electronic device. Consequently, there is a delay in controlling the screen to be lit up by the electronic device, and user experience is reduced.

Embodiments of this disclosure provide a screen-on control method and an electronic device. When a high-power sensor of the electronic device is in a disabled state, the electronic device may determine a to-be-lit-up screen based on a screen-on trigger signal detected by a low-power sensor, and then control a corresponding screen to be lit up. In this way, the electronic device can control the screen to be lit up in time in response to the screen-on trigger signal, so that duration from a moment for receiving the screen-on trigger signal to a moment for controlling the screen to be lit up is relatively short, and a user is almost unaware of the duration. Therefore, user experience can be improved.

Examples of devices and apparatuses in the following embodiments of this disclosure are first described.

Figure 2A:
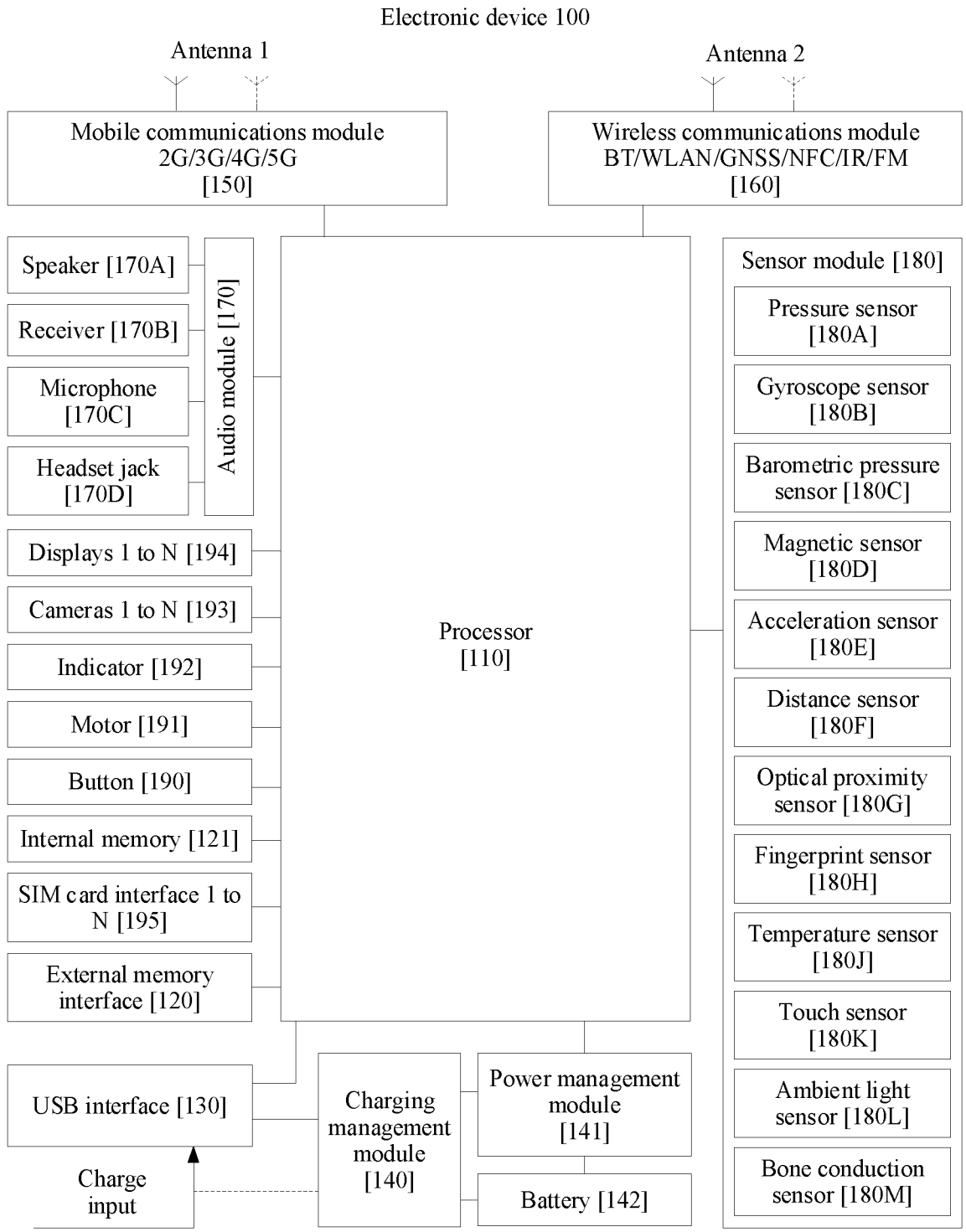
FIG. 2A is a schematic diagram of an example hardware structure of an electronic device according to an embodiment of this disclosure.

FIG. 2A is a schematic diagram of a structure of an electronic device 100.

The electronic device 100 may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The display screen 194 includes a first screen and a second screen. The sensor module 180 may include a pressure sensor 180A, a gyroscope sensor 180B, a barometer sensor 180C, a magnetic sensor 180D, an ACC sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. In this embodiment, the gyroscope sensor 180B and the ACC sensor 180E are, for example, high-power sensors, and other sensors included in the sensor module 180 except the gyroscope sensor 180B and the ACC sensor 180E are, for example, low-power sensors.

It may be understood that the structure shown in embodiments of this disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. In some embodiments, the electronic device 100 may alternatively include one or more processors 110.

The controller may be a nerve center and a command center of the electronic device 100. The controller may generate an operation control signal based on instruction operation code and a time sequence signal, to complete control of instruction detection.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, so that efficiency of the electronic device 100 is improved.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronization serial bus, and includes one serial data line (SDL) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a BLUETOOTH headset.

The PCM interface may also be used for audio communication, to sample, quantize, and encode an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a BLUETOOTH headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a BLUETOOTH module in the wireless communications module 160 through the UART interface, to implement a BLUETOOTH function. In some embodiments, the audio module 170 may transmit an audio signal to the wireless communications module 160 through the UART interface, to implement a function of playing music by using a BLUETOOTH headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset, to play audio through the headset. This interface may be further configured to connect to another electronic device such as an AR device.

It may be understood that an interface connection relationship between modules illustrated in embodiments of this disclosure is merely an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger, or may be a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes second generation (2G)/third generation (3G)/fourth generation (4G)/fifth generation (5G) or the like and that is applied to the electronic device 100. The mobile communications module 150 may include at least two filters, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules in the mobile communications module 150 may be disposed in the processor 110. In some embodiments, at least some functional modules of the mobile communications module 150 may be disposed in the same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, and the like), or displays an image or a video on the display 194. In some embodiments, the modem processor may be an independent device. In some other embodiments, the modem processor may be independent of the processor 110, and is disposed in the same device as the mobile communications module 150 or another functional module.

The wireless communications module 160 may provide a wireless communication solution that includes a wireless local area network (WLAN) (for example, a WI-FI network), BLUETOOTH (BT), a global navigation satellite system (GNSS), frequency modulation (FM), near-field communication (NFC), an infrared (IR) technology, or the like and that is applied to the electronic device 100. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

In some embodiments, the wireless communication solution provided by the mobile communications module 150 may enable the electronic device to communicate with a device (for example, a cloud server) in a network, and the WLAN wireless communication solution provided by the wireless communications module 160 may also enable the electronic device to communicate with the device (for example, the cloud server) in the network. In this way, the electronic device may perform data transmission with the cloud server.

The electronic device 100 may implement a display function by using the display 194, the application processor, and the like. The display 194 is configured to display a control, information, an image, and the like. The display screen 194 includes the first screen and the second screen, and includes a display panel. The display screen 194 may be a flexible display. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. For example, the processor 110 may control the display panel to emit light, so that at least one of the first screen and the second screen is lit up.

The electronic device 100 can implement a photographing function through the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The light-sensitive element may be a charge-coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, red, green, and blue (RGB) or luma, blue projection, and red projection (YUV). In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. Therefore, the electronic device 100 can play or record videos of a plurality of coding formats, for example, Moving Picture Experts Group (MPEG)-1, MPEG-2, MPEG-3, and MPEG-4.

The NPU is a neural-network (NN) computing processor. The NPU quickly processes a screen-on trigger signal with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro Secure Digital (SD) card, to extend a storage capability of the electronic device 100. The external memory card communicates with the processor 110 through the external memory interface 120, to implement a data storage function. For example, data such as music, a photo, and video are stored in the external memory card.

The internal memory 121 may be configured to store one or more computer programs, and the one or more computer programs include instructions. The processor 110 may run the instructions stored in the internal memory 121, so that the electronic device 100 performs a screen-on control method, various function applications, data processing, and the like that are provided in some embodiments of this disclosure. The internal memory 121 may include a program storage area and a data storage area. The program storage area may store an operating system. The program storage area may further store one or more applications (such as gallery and contacts), and the like. The data storage area may store created during use of the electronic device 100. In addition, the internal memory 121 may include a high-speed random-access memory (RAM), or may include a non-volatile memory, for example, at least one magnetic disk storage device, a flash memory, or a Universal Flash Storage (UFS).

The electronic device 100 may implement audio functions by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal for output, and convert an analog audio input into a digital audio signal. The audio module 170 may be further configured to code and decode audio signals. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When a user makes a call, or sends voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 millimeters (mm) open mobile terminal platform (OMTP) standard interface or Cellular Telecommunications Industry Association of the United States of America (USA) (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing a short message is executed. When a touch operation whose touch operation intensity is greater than or equal to the first pressure threshold is performed on the Messages icon, an instruction for creating a new short message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in navigation and motion sensing game scenarios. For example, when each screen of the electronic device 100 is in a screen-off state, a function of the gyroscope sensor 180B is disabled.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may collect magnetometer data by using the magnetic sensor 180D. Further, the electronic device 100 detects, based on the magnetometer data, orientations of the first screen and the second screen, and a status such as whether the first screen and the second screen are expanded.

The ACC sensor 180E may detect magnitude of accelerations in various directions (usually on three axes) of the foldable electronic device 100, may detect a magnitude and a direction of gravity when the electronic device 100 is still, may be further configured to identify a posture of the electronic device, and may be applied to an application such as switching between a landscape mode and a portrait mode or a pedometer. For example, when each screen of the electronic device 100 is in a screen-off state, a function of the ACC sensor 180E is disabled.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include an LED and an optical detector, for example, a photodiode. The LED may be an infrared LED. The electronic device 100 emits infrared light by using the LED. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a flip cover mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint unlocking, application access locking, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K may also be referred to as a touch panel or a touch-sensitive surface. The touch sensor 180K may be disposed on the display 194, and the touch sensor 180K and the display 194 constitute a touchscreen, which is also referred to as a "touchscreen (touch panel (TP))". The touch sensor 180K is configured to detect a touch operation performed on or near the touch sensor 180K. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch-sensitive button. The electronic device 100 may receive a key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (such as a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 may also be compatible with different types of SIM cards. The SIM card interface 195 is also compatible to an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

The example electronic device 100 shown in FIG. 2A may detect a screen-on trigger signal by using a low-power sensor such as the touch sensor 180K or the fingerprint sensor 180H. The electronic device 100 may further detect a posture of the electronic device 100 by using the high-power sensor such as the gyroscope sensor 180B or the ACC sensor 180E. The electronic device 100 may further control, by using the processor 110, a to-be-lit-up screen to be lit up, or the like.

Figure 2B:
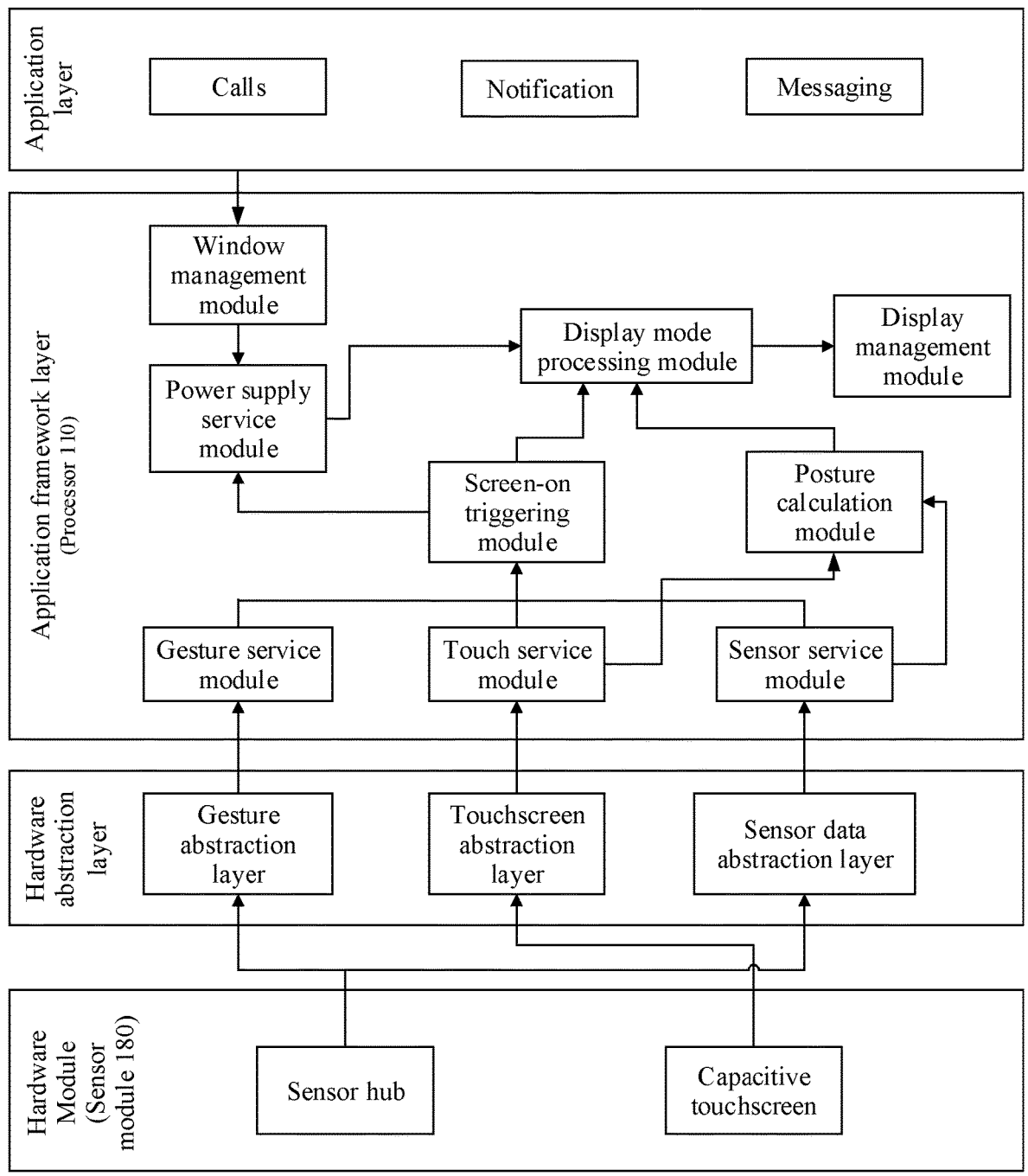
FIG. 2B is a schematic diagram of an example architecture of a screen-on control system according to an embodiment of this disclosure.

FIG. 2B is a schematic diagram of an architecture of a screen-on control system 200. The screen-on control system 200 includes an application layer, an application framework (FWK) layer, a hardware abstraction layer (HAL), and a hardware module.

In embodiments of this disclosure, the application framework layer may also be referred to as an operating system layer, and includes a system module (or a function module) of the electronic device 100. For example, each function module of the application framework layer may be integrated into the processor 110 shown in FIG. 2A, and a function of the application framework layer in embodiments may be implemented by using the processor 110 shown in FIG. 2A. The hardware module in embodiments of this disclosure includes a data collection interface of each physical sensor in the sensor module 180 shown in FIG. 2A.

The application layer may include a series of application packages, for example, application programs such as "calls", "notification", and "messaging".

The application framework layer is configured to receive data input by the application layer and the HAL, execute a function corresponding to the corresponding data, and control a screen that matches the corresponding data to be lit up. The application program framework layer may include a window management module (WMS), a power supply service module (PMS), a display mode processing module, a display management module (DMS), a screen-on trigger module, a gesture service (motion service (MS)) module, a touch service (TS) module, a sensor service module, a posture calculation module, and the like. In some embodiments, the screen-on trigger module may include a raise-to-wake module, a double-tap-to-wake module, a fingerprint unlock module, another module (not shown in FIG. 2B) that can trigger a screen to be lit up, such as an optical proximity sensing module, and the like. The posture calculation module may include a posture identification module, a posture fusion module, and the like (not shown in FIG. 2B).

The HAL is an interface layer located between the application framework layer and the hardware module, and is configured to receive various types of sensor data obtained by the hardware module in response to user trigger, identify and parse the sensor data, to obtain operation data and location data of the user trigger, and is further configured to transmit the operation data and the location data obtained after the parsing to the application framework layer. The HAL includes a gesture abstraction layer (motion HAL), a touchscreen abstraction layer (TP HAL), a sensor data abstraction layer (sensor HAL), and the like.

The hardware module includes a sensor hub, a capacitive touchscreen, and the like. The sensor hub is configured to transmit collected data to at least one of the gesture abstraction layer and the sensor data abstraction layer, and the capacitive touchscreen is configured to transmit collected data to the touchscreen abstraction layer and the like.

It may be understood that the architecture shown in FIG. 2B does not constitute a specific limitation on the electronic device 100. In some other embodiments of this disclosure, the electronic device 100 may include more or fewer modules than those shown in the figure, or some components may be combined, or some components may be split, or different component arrangements may be used. The components shown in the figure may be implemented by hardware, software, or a combination of software and hardware.

For example, in some embodiments, the sensor hub is configured to detect a screen-on trigger signal, and report the screen-on trigger signal to a corresponding abstraction layer in the HAL. The screen-on trigger signal includes, for example, orientation data of the first screen, orientation data of the second screen, location data, and magnetometer data. For example, the sensor hub collects magnetometer data, and then reports the magnetometer data to the sensor data abstraction layer. In some other embodiments, the sensor hub is configured to collect sensor data determined by the high-power sensor, and the sensor data is referred to as posture sensor data in embodiments. Then, the sensor hub reports the posture sensor data to the sensor data abstraction layer in the HAL. The posture sensor data includes increments of the first screen in three directions X, Y, and Z, increments of the second screen in the three directions X, Y, and Z, or an included angle between the first screen and the second screen.

The capacitive touchscreen is configured to collect touch operation data of the user. The touch operation data of the user includes, for example, double-tap operation data and fingerprint unlock operation data. The capacitive touchscreen is further configured to transmit the touch operation data to the touchscreen abstraction layer and another abstraction layer corresponding to the touch operation of the user, for example, a fingerprint abstraction layer (not shown in FIG. 2B).

The gesture abstraction layer is configured to receive gesture data reported by the sensor hub, and report the gesture data to the gesture service module. The gesture data includes a pick-up gesture event, the orientation data of the first screen, and the orientation data of the second screen.

The touchscreen abstraction layer is configured to receive the touch operation data collected by the capacitive touchscreen, parse the touch operation data to obtain location data of a screen touched by the user, user contact data, and the like, and transmit the location data and the user contact data to the touch service module. The location data is, for example, double-tap coordinates data, double-tap area data, or area data corresponding to a user fingerprint. The touchscreen abstraction layer is further configured to identify operation content data (for example, a double-tap operation event) corresponding to the touch operation data, and then report the operation content data to a corresponding service module, for example, report the double-tap operation data to an input management service module. The user contact data indicates a user contact status, and the user contact status is at least one of the following: contacting the first screen and contacting the second screen.

The sensor data abstraction layer is configured to receive data reported by the sensor hub, and report the data to the sensor service module. The data received by the sensor data abstraction layer includes, for example, the magnetometer data and the posture sensor data.

The window management module is configured to receive information that is input by the application layer and that indicates that an application is triggered, and transmit corresponding data to the power supply service module. For example, if the call application is triggered by an incoming call request, the window management module receives information that is input by the call application and that indicates that the call application is triggered, and then transmits corresponding data to the power supply service module, to further trigger the electronic device to light up a screen.

The power supply service module is configured to receive data reported by either of the window management module and the screen-on trigger module, and detect a status of the electronic device 100. If the electronic device 100 is in a standby state, the power supply service module generates an instruction for waking up the electronic device 100, and then transmits the wake-up instruction to the display mode processing module. If the electronic device 100 is in a wakeup state, the power supply service module no longer sends a wake-up instruction to the display mode processing module.

The gesture service module is configured to receive the gesture data reported by the gesture abstraction layer, and report the orientation data of the first screen and the orientation data of the second screen in the gesture data to the screen-on trigger module.

In some embodiments, the touch service module is configured to receive the screen location data reported by the touchscreen abstraction layer, and then transmit the screen location data to the screen-on trigger module. In some other embodiments, the touch service module is further configured to receive the user contact data reported by the touchscreen abstraction layer, and then report the user contact data to the posture calculation module.

In some embodiments, the sensor service module is configured to periodically receive the magnetometer data from the sensor data abstraction layer, and report the magnetometer data to the display mode processing module. In some other embodiments, the sensor service module is further configured to receive the posture sensor data from the sensor data abstraction layer, and transmit the posture sensor data to the posture calculation module.

The screen-on trigger module is configured to receive screen-on trigger data, the orientation data of the first screen, the orientation data of the second screen, the location data, and the like. The screen-on trigger data includes the pick-up gesture event, the double-tap operation data, the fingerprint unlock operation data, and the like. Then, the screen-on trigger module generates a trigger instruction based on the screen-on trigger data, and reports the trigger instruction to the power supply service module. The screen-on trigger module is further configured to report the orientation data of the first screen, the orientation data of the second screen, the location data, or the like to the display mode processing module in response to an obtaining request of the display mode processing module.

The posture calculation module is configured to determine an initial posture of the electronic device based on the posture sensor data. The posture calculation module is further configured to receive the user contact data from the touch service module, determine a posture of the electronic device based on the initial posture and a user contact status indicated by the user contact data, and report the determined posture to the display mode processing module.

After receiving the wake-up instruction transmitted by the power supply service module, the display mode processing module may obtain the orientation data of the first screen, the orientation data of the second screen, or the location data of the electronic device from the screen-on trigger module, or obtain the magnetometer data from the sensor service module, or the like. Then, the display mode processing module generates first display mode data based on the obtained orientation data of the first screen, the obtained orientation data of the second screen, the obtained location data, the obtained magnetometer data, or the like, where the first display mode data includes information about a screen to be lit up. Then, the display mode processing module transmits the first display mode data to the display management module. The display mode processing module is further configured to control the high-power sensor to enabled after receiving the wakeup instruction transmitted by the power supply service module. Further, the display mode processing module is further configured to re-determine the to-be-lit-up screen based on the posture determined by the posture calculation module, and then detect whether the determined screen is the same as a screen that is currently in a screen-on state. If the determined screen is different from the screen that is currently in a screen-on state, the display mode processing module generates second display mode data, where the second display mode data includes information about a screen obtained after the lit-up screen is switched. Then, the display mode processing module transmits the second display mode data to the display management module.

The display management module is configured to control a screen indicated by the first display mode data or the second display mode data to be lit up.

The screen-on control system 200 shown in FIG. 2B provides a hardware module and a HAL layer for collecting sensor data, user touch data, and the like, and further provides a functional component and the like for controlling a screen to be lit up based on a screen-on trigger signal.

The following describes an example screen-on scenario in this disclosure from a perspective of a user.

For example, the electronic device 100 is a foldable mobile phone. With reference to the embodiment shown in FIG. 2A, the display screen 194 of the electronic device 100 includes a first screen and a second screen. Status presented on the first screen and the second screen in different use scenarios are shown in FIG. 1A to FIG. 1E. Details are not described herein again.

To clearly describe this disclosure, the following describes a screen-on state of the mobile phone. "The first screen is lit up" described in this specification means that the first screen is in a screen-on state, and the second screen is in a screen-off state. "The second screen is lit up" described in this specification means that the second screen is in a screen-on state, and the first screen is in a screen-off state. "A large screen is lit up" described in this specification means that both the first screen and the second screen are in a screen-on state. The foregoing statuses are directly referenced in the following of this specification, and no repeated explanation is provided.

It should be noted that, in embodiments of this disclosure, the initial state of the electronic device 100 is, for example, a standby state, that is, each screen of the electronic device 100 is in a screen-off state. In an execution process of embodiments of this disclosure, a scenario presented by the electronic device 100 may include two phases. Phase 1: A screen is instantly lit up. To be specific, at a moment at which the electronic device 100 receives a user trigger operation or a communications signal, the electronic device 100 immediately gives a response, to control a screen corresponding to the operation information to be lit up. The "A screen is instantly lit up" described in embodiments of this disclosure means that the electronic device 100 lights up the screen within a specific time period from a moment at which the electronic device 100 receives the user trigger operation or the communications signal. The specific time period is, for example, 300 milliseconds (ms). The user does not sense a delay or frame freezing for "a specific time period". Therefore, from a perspective of the user, the electronic device 100 lights up the screen instantly. Phase 2: The lit-up screen is corrected. To be specific, it is detected whether the lit-up screen in the first phase matches an operation scenario of the user. If the lit-up screen in the first phase does not match the operation scenario of the user, the electronic device 100 switches the lit-up screen to a screen that matches the operation scenario of the user.

The following describes, with reference to the two phases, an example of a scenario presented in this disclosure.

Phase 1: A screen is instantly lit up.

Figure 3A:
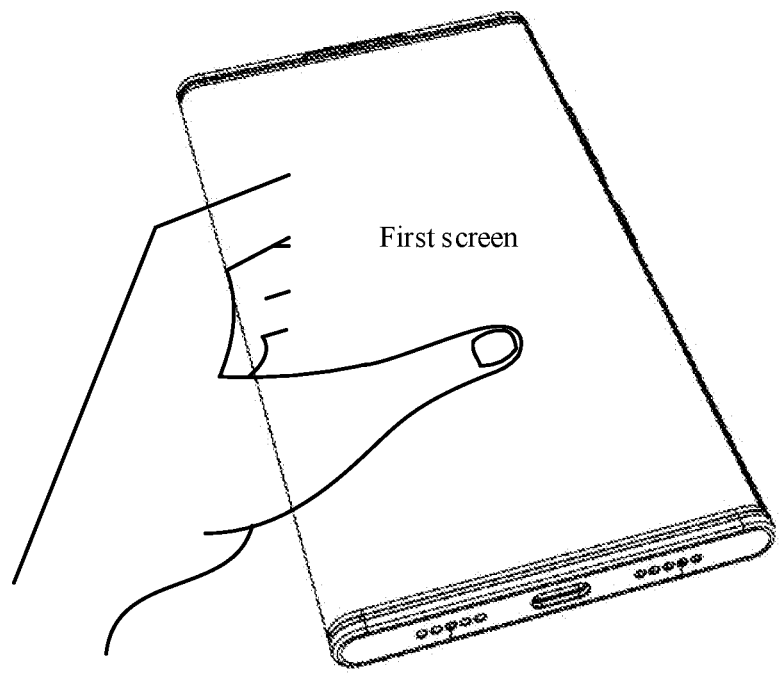
FIG. 3A is a schematic diagram of a first example operation scenario of a hand raising operation according to an embodiment of this disclosure.
Figure 3B:
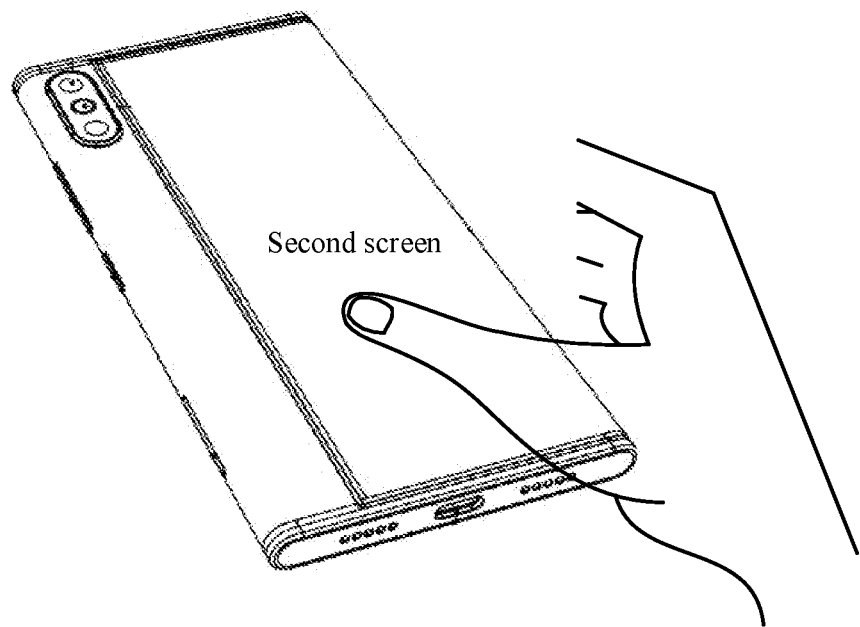
FIG. 3B is a schematic diagram of a second example operation scenario of a hand raising operation according to an embodiment of this disclosure.

Scenario 1: In a scenario shown in FIG. 3A, a mobile phone is in a folded state, and a first screen of the mobile phone faces a user. In this scenario, when the user holds mobile phone with a hand and lifts the hand, the first screen of the mobile phone is instantly lit up. Similarly, as shown in FIG. 3B, the mobile phone is in a folded state, and a second screen faces the user. When the user holds the mobile phone with a hand and raises the hand, the second screen of the mobile phone is instantly lit up. It should be understood that, if the mobile phone is in an unfolded state, a large screen obtained by combining the first screen and the second screen of the mobile phone faces the user. When the user holds the mobile phone with a hand and lifts the hand, the large screen is instantly lit up.

Figure 3C:
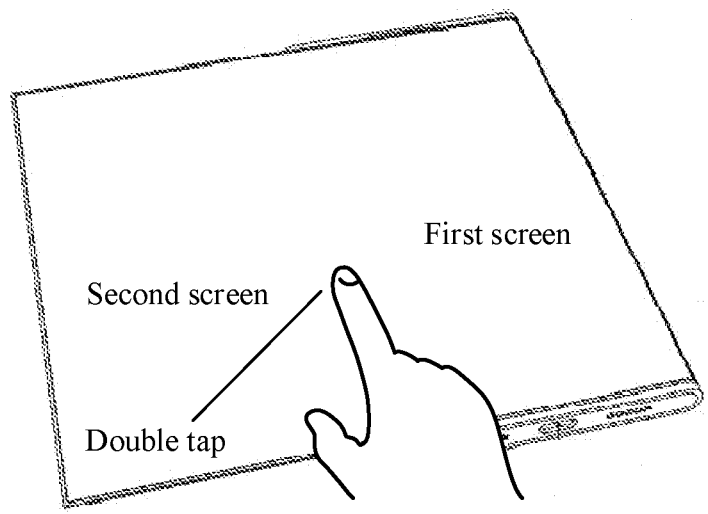
FIG. 3C is a schematic diagram of a first example operation scenario of a double-tap operation according to an embodiment of this disclosure.
Figure 3D:
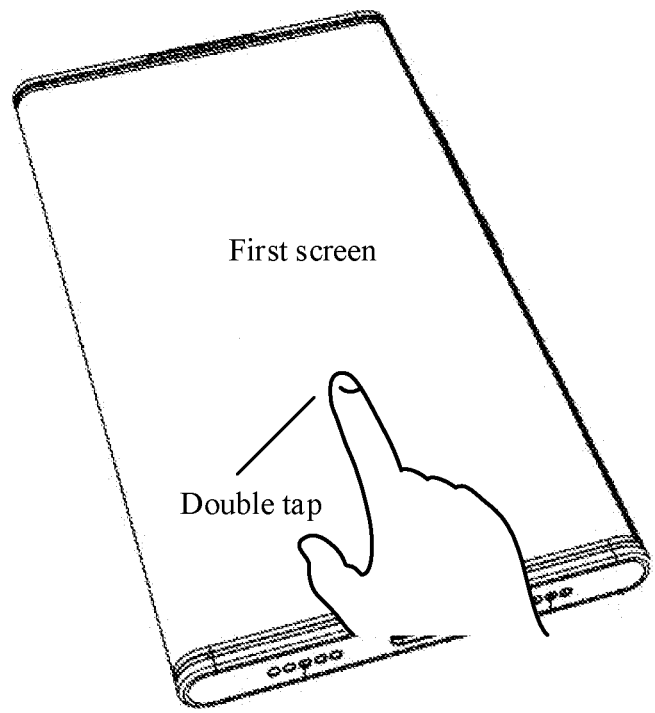
FIG. 3D is a schematic diagram of a second example operation scenario of a double-tap operation according to an embodiment of this disclosure.
Figure 3E:
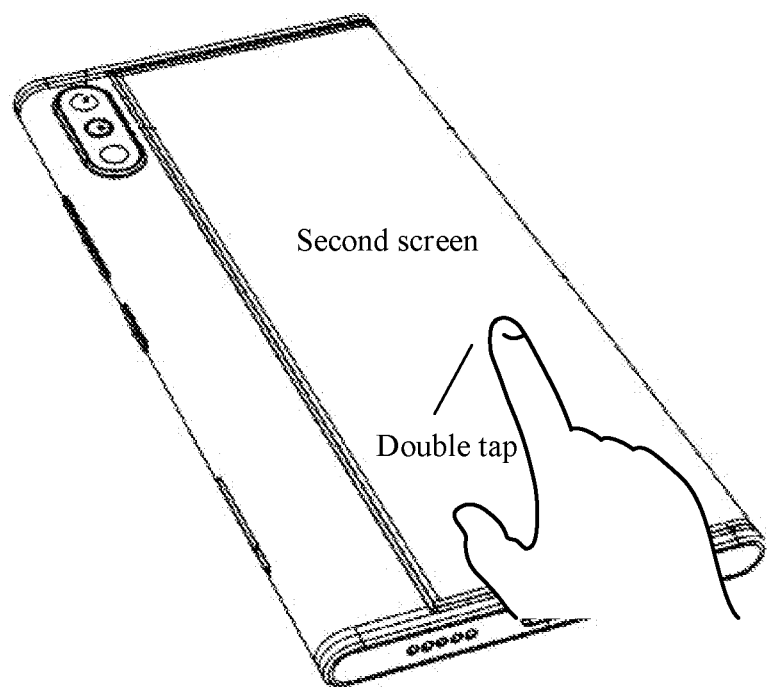
FIG. 3E is a schematic diagram of a third example operation scenario of a double-tap operation according to an embodiment of this disclosure.

Scenario 2: In a scenario shown in FIG. 3C, a mobile phone is in an unfolded state, and a large screen obtained by combining a first screen and a second screen faces the user. A user double-taps any location on the first screen or the second screen, and the large screen is instantly lit up. In a scenario shown in FIG. 3D, the mobile phone is in a folded state, and the first screen faces the user. The user double-taps the first screen, and the first screen is instantly lit up. In a scenario shown in FIG. 3E, the mobile phone is in a folded state, and the second screen faces the user. The user double-taps the second screen, and the second screen is instantly lit up.

Figure 3F:
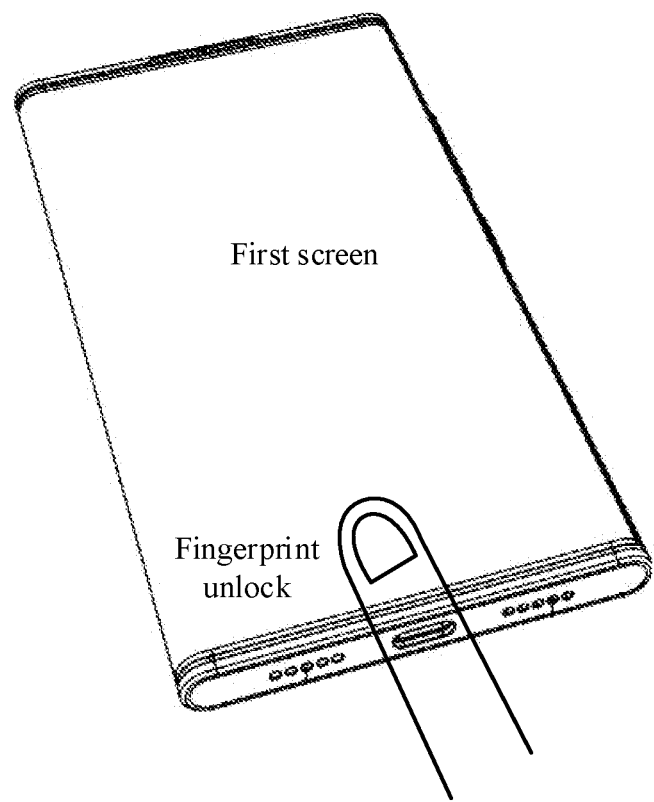
FIG. 3F is a schematic diagram of a first example operation scenario of a fingerprint unlock operation according to an embodiment of this disclosure.
Figure 3G:
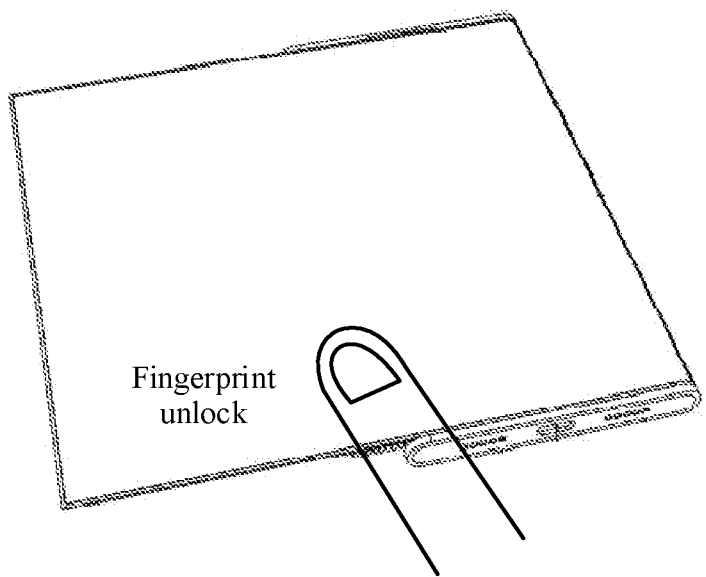
FIG. 3G is a schematic diagram of a second example operation scenario of a fingerprint unlock operation according to an embodiment of this disclosure.

Scenario 3: In a scenario shown in FIG. 3F, a mobile phone is in a folded state, and a first screen faces a user. When the user enters a fingerprint in a fingerprint unlock area of the first screen, the first screen of the mobile phone is instantly lit up, and an interface obtained after the unlocking is displayed. In a scenario shown in FIG. 3G, the mobile phone is in an unfolded state, and a large screen faces the user. When the user enters a fingerprint in a fingerprint unlock area of the large screen, the large screen obtained by combining the first screen and a second screen of the mobile phone is instantly lit up, and an interface obtained after the unlocking is displayed.

Scenario 4: When a mobile phone receives an incoming call request, and the mobile phone is in an unfolded state, a large screen of the mobile phone is instantly lit up. If the mobile phone is in a folded state, a screen set with a microphone and an earpiece of the mobile phone is instantly lit up. For example, the screen set with a microphone and an earpiece is, for example, a first screen. If the mobile phone is in a folded state, and the mobile phone receives the incoming call request, the first screen is instantly lit up and displays an incoming call request window. If the mobile phone is in a folded state, and both the first screen and a second screen of the mobile phone are set with a microphone and an earpiece, then, the first screen is instantly lit up.

Scenario 5: A mobile phone is in a folded state, and a user approaches a first screen to answer a call. In a process in which the user controls the mobile phone to move away from the user, the first screen is instantly lit up.

Another scenario: When a user presses a power button, the user enters a fingerprint in a side fingerprint unlocking area of a mobile phone, or the user inserts and removes a USB cable, if the mobile phone is in an unfolded state, a large screen is instantly lit up, or if the mobile phone is in a folded state, for example, a first screen is instantly lit up.

It may be understood that the foregoing implementation scenarios are merely examples for description, and constitutes no limitation on the technical solution of this disclosure. In some other embodiments, in some other adaptive scenarios, a user operation may also trigger the mobile phone to light up the screen instantly. In addition, the foregoing describes implementation scenarios of this disclosure by using examples in which the mobile phone is in a folded state or an unfolded state. In an actual operation, the status of the mobile phone may further include a state in which there is an included angle between the first screen and the second screen, for example, a state in which the included angle between the first screen and the second screen is 30 degrees. Details are not described herein.

It may be understood that the foregoing description is merely provided by using the foldable mobile phone as an example, and constitutes no limitation on the technical solution of this disclosure. In some other embodiments, when the electronic device 100 includes at least two screens, neither the at least two screens can be folded nor the electronic device 100 can be folded, when the user performs an operation on any one of the at least two screens, for example, double-tapping or fingerprint unlocking, a corresponding screen may also be instantly lit up. Details are not described herein again.

It can be learned that, in this implementation, when the user triggers the mobile phone, a screen of the mobile phone that matches the trigger operation of the user can be instantly lit up, so that user experience can be improved.

Phase 2: The lit-up screen is corrected.

When the electronic device 100 is a foldable mobile phone, in some scenarios in the first phase, the instantly lit-up screen may not match a use scenario of the user. For example, the user expects that the instantly lit-up screen is the first screen, but the screen that is actually lit up by the mobile phone is the large screen. Based on this, after the first phase, the mobile phone may detect whether the instantly lit-up screen matches a user's expectation. If the instantly lit-up screen does not match the user's expectation, the mobile phone switches the lit-up screen to a screen that matches the user's expectation.

Figure 3H:
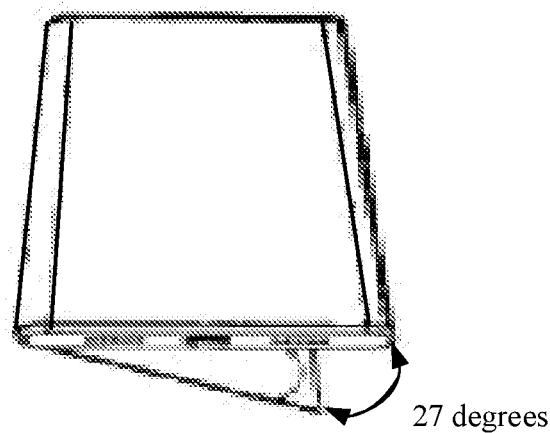
FIG. 3H is a schematic diagram of an example operation scenario of lit-up screen correction according to an embodiment of this disclosure.

For example, an initial state of the mobile phone is shown in FIG. 3H. An included angle between the first screen and the second screen is, for example, 27 degrees. When the user presses the power button, the mobile phone determines that the status of the mobile phone is in an unfolded state. Correspondingly, the large screen of the mobile phone is instantly lit up. However, in this embodiment, for example, the user considers that the mobile phone is in a folded state, and correspondingly, the user expects the first screen to be lit up. Based on this, after the large screen is lit up, the mobile phone determines, based on the current posture of the mobile phone and the gesture of the user, that the user expects the first screen to be lit up, and then the mobile phone switches the lit-up screen from the large screen to the first screen.

It may be understood that the foregoing implementation scenarios are merely examples for description, and constitutes no limitation on the technical solution of this disclosure. In some other embodiments, as a scenario in which the user performs an operation on the mobile phone changes, the lit-up screen of the mobile phone may further undergo another adaptive change.

It can be learned that after the screen is instantly lit up, the mobile phone may further correct the lit-up screen in time, so that the lit-up screen correctly matches an implementation scenario of the user, and user experience can be improved.

The following describes an example of the screen-on control method from a perspective of the electronic device 100.

Figure 4:
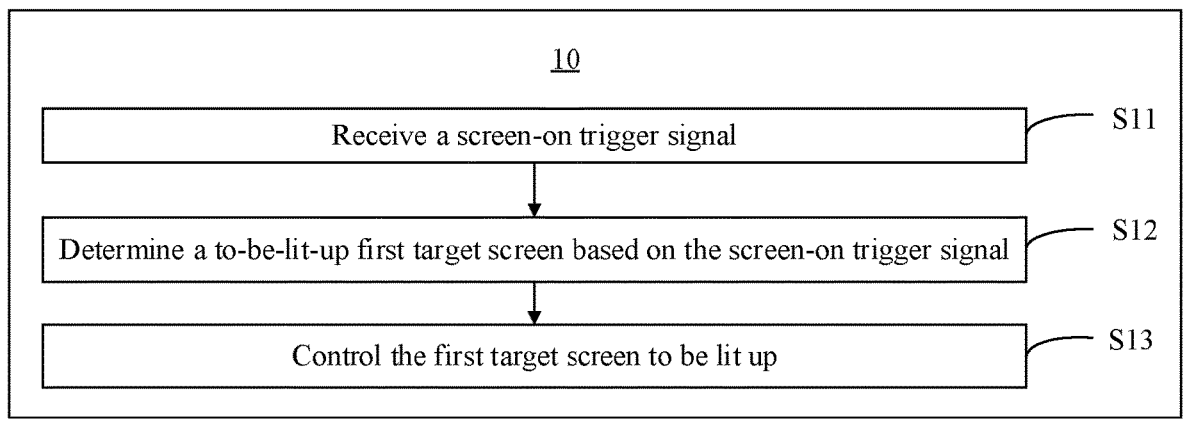
FIG. 4 is a flowchart of an example screen-on control method according to an embodiment of this disclosure.

FIG. 4 shows a screen-on control method 10. The screen-on control method 10 (or the method 10) is applied to an electronic device 100. The electronic device 100 includes a first screen and a second screen. A high-power sensor of the electronic device 100 is in a disabled state. A low-power sensor of the electronic device is in an enabled state. The high-power sensor and the low-power sensor are described in the foregoing embodiments. Details are not described herein again. The method 10 includes the following steps.

Step S11: Receive a screen-on trigger signal.

The screen-on trigger signal may be from the low-power sensor or a processor 110.

In some embodiments, the screen-on trigger signal includes orientation data of the first screen and orientation data of the second screen. In some other embodiments, the screen-on trigger signal includes magnetometer data. In still some other embodiments, the screen-on trigger signal includes magnetometer data and location data.

For example, the screen-on trigger signal is obtained by detecting an operation instruction that is entered by the user or a communications signal by the low-power sensor or the processor 110. The operation instruction of the user includes a double-tap operation instruction, a fingerprint unlock instruction, a user hand raising signal, a signal indicating that the user approaches a screen or moves away from the screen, a power button touch control instruction, a USB interface connection or disconnection signal, and the like. The communications signal includes, for example, an incoming call signal, a notification via short message signal, and another communications signal.

With reference to the embodiment shown in FIG. 2A, the electronic device may receive the double-tap operation instruction and the fingerprint unlock instruction by using the display 194. The electronic device may receive the power button touch control instruction and the USB interface connection or disconnection signal through various interfaces. The electronic device may receive, by using the sensor module 180, the user hand raising signal and the signal indicating that the user approaches a screen or moves away from the screen. The electronic device may receive the communications signal by using the mobile communications module 150. With reference to the embodiment shown in FIG. 2B, the electronic device may receive the double-tap operation instruction and the fingerprint unlock instruction by using the capacitive touchscreen. The electronic device may receive, by using the sensor hub, the user hand raising signal and the signal indicating that the user approaches a screen or moves away from the screen. For details about the embodiments corresponding to the operation instruction input by the user or the communications signal and the screen-on trigger signal detected by the low-power sensor or the processor, refer to the descriptions in the foregoing embodiments. Details are not described herein again.

Step S12: Determine a to-be-lit-up first target screen based on the screen-on trigger signal.

The first target screen is a first screen, a second screen, or a screen obtained by combining the first screen and the second screen. For example, the first target screen is a screen of the electronic device that varies with an implementation scenario. Refer to the descriptions in the embodiments shown in FIG. 3A to FIG. 3H. Details are not described herein again.

With reference to the embodiment shown in FIG. 2A, in some embodiments, the processor 110 may identify a screen facing the user based on the orientation data of the first screen and the orientation data of the second screen, and use the screen facing the user as the first target screen. In some other embodiments, the processor 110 determines relative locations of the first screen and the second screen based on the magnetometer data, to determine a status of the electronic device. When the electronic device is in an unfolded state, the processor 110 determines that a large screen obtained by combining the lit-up first screen and the lit-up second screen is the first target screen, or when the electronic device is in a folded state, determines that the first screen is the first target screen. In still some other embodiments, when the electronic device is in a folded state, the processor 110 determines that a screen indicated by the location data is the first target screen.

It may be understood that the foregoing embodiment of determining the first target screen based on the screen-on trigger signal is only an example for description, and constitutes no limitation on an implementation process of this disclosure. In still some other embodiments, the screen-on trigger signal may alternatively be another signal or data. Correspondingly, an implementation process of determining the first target screen based on the screen-on trigger signal may also be different from the foregoing implementation process. Details are not described herein again.

Step S13: Control the first target screen to be lit up.

In this implementation, when the high-power sensor is in a disabled state, the electronic device may determine a to-be-lit-up screen based on the screen-on trigger signal detected by the low-power sensor, and control a corresponding screen to be lit up. In this way, when the high-power sensor is in a disabled state, the target screen can be controlled to be instantly lit up in time in response to an operation of the user, so that user experience can be greatly improved.

Figure 5A:
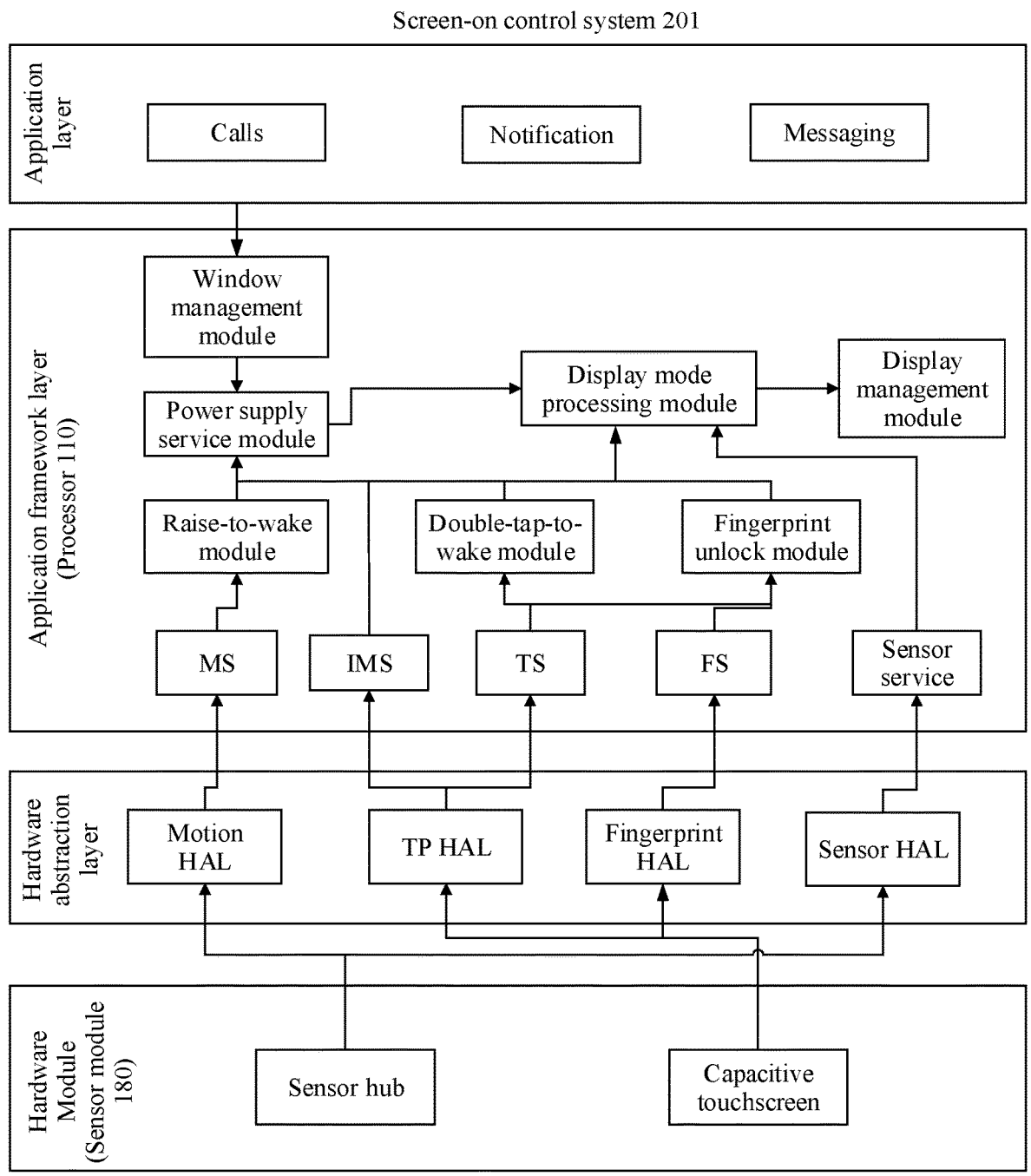
FIG. 5A is a schematic diagram of an example architecture of a screen-on control system according to an embodiment of this disclosure.

With reference to a screen-on control system 201 shown in FIG. 5A, the following describes an example implementation process of the method 10 from a perspective of an electronic device.

The screen-on control system 201 shown in FIG. 5A includes an application program layer, an FWK layer, a HAL, and a hardware module. The FWK layer includes a window management module, a power supply service module, a display mode processing module, a display management module, a raise-to-wake module, a double-tap-to-wake module, a fingerprint unlock module, a gesture service module, an input management service module (input manager service (IMS)), a fingerprint service module (fingerprint service (FS)), a touch service module, and a sensor service module. The HAL includes a motion HAL, a TP HAL, a fingerprint unlock abstraction layer (fingerprint HAL), and a sensor HAL. The application layer and the hardware module are the same as those in the embodiment shown in FIG. 2B. Details are not described herein again.

With reference to the foregoing scenario 1, in a process in which the user holds the electronic device with a hand and raises the hand, the sensor hub collects sensor data corresponding to the user hand raising signal, and then parses the sensor data to obtain gesture data. The gesture data includes a pick-up gesture event, the orientation data of the first screen, and the orientation data of the second screen. In this embodiment, the screen facing the user is a first target screen. Then, the sensor hub reports the gesture data to the motion HAL. The motion HAL continues to report the gesture data to the gesture service module. The gesture service module reports the orientation data of the mobile phone to the raise-to-wake module. The raise-to-wake module generates a first trigger instruction, and then reports the first trigger instruction to the power supply service module. The power supply service module detects, in response to the first trigger instruction, whether the electronic device is in a standby state, and if the electronic device is in a standby state, the power supply service module generates a first wake-up instruction, and then sends the first wakeup instruction to the display mode processing module. The display mode processing module obtains, in response to the first wakeup instruction, the orientation data of the mobile phone from the raise-to-wake module, and then determines the first target screen based on the orientation data of the mobile phone, to generate first display mode data. Then, the display mode processing module transmits the first display mode data to the display management module. The display management module controls the first target screen to be lit up. In this embodiment, the first target screen may vary with an implementation scenario. For example, in the scenario shown in FIG. 3A, the first target screen is the first screen. For another example, in the scenario shown in FIG. 3B, the first target screen is the second screen.

With reference to the foregoing scenario 2, when the user double taps a display of the electronic device, the capacitive touchscreen collects touch operation data corresponding to a double-tap operation instruction, and then reports the touch operation data to the TP HAL. The TP HAL parses the touch operation data to obtain double-tap operation data and coordinates of the double-tap operation. In this embodiment, a screen indicated by the coordinates of the double-tap operation is a first target screen. Then, the TP HAL reports the double-tap operation data to the input management service module, and reports the coordinates of the double-tap operation to the touch service module. The input management service module performs a function triggered by the double-tap operation data. The touch service module reports the coordinates of the double-tap operation to the double-tap-to-wake module. The double-tap-to-wake module generates a second trigger instruction, and then reports the second trigger instruction to the power supply service module. After determining that the electronic device is in a standby state, the power supply service module generates a first wakeup instruction, and then sends the first wakeup instruction to the display mode processing module. The display mode processing module obtains magnetometer data from the sensor service module in response to the first wakeup instruction, and obtains coordinates of the double-tap operation from the double-tap-to-wake module. Then, the display mode processing module determines a status of the electronic device based on the magnetometer data. When the electronic device is in an unfolded state, the display mode processing module determines that the large screen is the first target screen. When the electronic device is in a folded state, the display mode processing module determines that a screen corresponding to the coordinates of the double-tap operation is the first target screen. Further, the display mode processing module generates first display mode data, and then transmits the first display mode data to the display management module, and the display management module controls the first target screen to be lit up. In this embodiment, the first target screen is related to a status of the screen when the user double-taps the screen to trigger the screen, as described in the embodiments shown in FIG. 3C to FIG. 3E. Details are not described herein again.

With reference to the foregoing scenario 3, when the user performs fingerprint unlocking on the display of the electronic device, the capacitive touchscreen collects fingerprint data corresponding to the fingerprint unlock instruction, and then reports the fingerprint data to the fingerprint HAL. The fingerprint HAL parses the fingerprint data to obtain area data corresponding to the fingerprint data, and identifies whether the fingerprint data matches prestored fingerprint data. If the fingerprint data matches the prestored fingerprint data, the fingerprint HAL generates fingerprint unlock operation data, and then transmit the area data and the fingerprint unlock operation data to the fingerprint service module. In this embodiment, a screen indicated by the area data is a first target screen. The fingerprint service module performs the unlocking operation in response to the fingerprint unlock operation data, and reports the area data to the fingerprint unlock module. The fingerprint unlock module generates a third trigger instruction, and then reports the third trigger instruction to the power supply service module. After determining that the electronic device is in a standby state, the power supply service module generates a first wakeup instruction, and then sends the first wakeup instruction to the display mode processing module. The display mode processing module obtains, in response to the first wakeup instruction, the area data from the fingerprint unlock module, and then determines the first target screen based on the area data, to generate first display mode data. Then, the display mode processing module transmits the first display mode data to the display management module, and the display management module controls the first target screen to be lit up. In this embodiment, the first target screen is related to the screen triggered by fingerprint unlocking of the user, as described in the embodiments shown in FIG. 3F to FIG. 3G. Details are not described herein again.

With reference to the foregoing scenario 4, the electronic device is, for example, a mobile phone. When the mobile phone receives an incoming call request, the call application package transmits the incoming call request data to the window management module. The window management module transmits an incoming call flag bit to the power supply service module. The power supply service module generates a second wakeup instruction, and then sends the second wakeup instruction to the display mode processing module. Then, the display mode processing module obtains magnetometer data from the sensor service module, and obtains hardware information, earpiece information, and microphone information of the mobile phone, then, determines a first target screen based on the magnetometer data and the hardware information of the mobile phone, and generates first display mode data, so that the display management module controls the first target screen to be lit up based on the first display mode data.

In some embodiments, when determining, based on the magnetometer data, that the mobile phone is in an unfolded state, the display mode processing module determines that the first target screen is a large screen. Then, the display mode processing module generates first display mode data. In this embodiment, the to-be-lit-up screen indicated by the first display mode data is the large screen. Then, the display management module controls the large screen to be lit up based on the first display mode data. In some other embodiments, for example, an earpiece and a microphone of the mobile phone are disposed on one screen. Correspondingly, after determining, based on the magnetometer data, that the mobile phone is in a folded state, the display mode processing module determines, based on the hardware information, the screen disposed with an earpiece and a microphone of the mobile phone, and determines the screen as the first target screen. Further, the display mode processing module generates first display mode data and transmits the first display mode data to the display management module. Then, the display management module controls, based on the first display mode data, a corresponding screen to be lit up. For example, the screen disposed with an earpiece and a microphone of the mobile phone is the first screen. In this embodiment, the first target screen is the first screen, and the display management module controls the first screen to be lit up. In some other embodiments, for example, both the first screen and the second screen are disposed with an earpiece and a microphone. Correspondingly, after determining, based on the magnetometer data, that the mobile phone is in a folded state, the display mode processing module determines, based on the hardware information, that both the first screen and the second screen are disposed with an earpiece and a microphone, and determines the first screen as the first target screen based on preset information. Further, the display mode processing module generates first display mode data and transmits the first display mode data to the display management module. Then, the display management module controls the first screen to be lit up.

Further, when the user approaches a screen of the mobile phone to answer a call, the screen is turned off. Then, when the user controls the first target screen to move away from the user, the sensor hub reports proximity sensor data by using the sensor HAL and the sensor service module. Then, the display mode processing module determines that the screen that is previously turned off is the first target screen. Further, the display mode processing module generates first display mode data and transmits the first display mode data to the display management module. Then, the display management module controls the first screen to be lit up.

When the user triggers a button, an interface, or a side fingerprint unlocking area of the electronic device, a corresponding function module receives a corresponding signal or instruction, and then reports corresponding data to the input management service module. The input management service module generates trigger data and sends the trigger data to the power supply service module. The power supply service module generates a second wakeup instruction, and then sends the second wakeup instruction to the display mode processing module. The display mode processing module obtains magnetometer data from the sensor service module in response to the second wakeup instruction, and then determines the first target screen based on the magnetometer data, to generate first display mode data. Then, the display mode processing module transmits the first display mode data to the display management module. The display management module controls a screen indicated by the first display mode data to be lit up. For example, in this embodiment, if the display mode processing module determines, based on the magnetometer data, that the electronic device is in a folded state, the display mode processing module determines the first screen as the first target screen, where a screen indicated by the first display mode data is the first screen, or if the display mode processing module determines, based on the magnetometer data, that the electronic device is in an unfolded state, the display mode processing module determines the large screen as the first target screen, where a screen indicated by the first display mode data is the large screen.

It should be noted that, in an actual operation process, the sensor hub always periodically detects magnetometer data, and reports the magnetometer data to the sensor service module. When the display mode processing module needs to determine the first target screen based on the magnetometer data, the display mode processing module may obtain the magnetometer data from the sensor service module. In addition, in the foregoing embodiments, the first wakeup instruction includes a wakeup command and module information that stores first target screen information, and the second wakeup instruction includes only a wakeup command. For example, in a double-tap operation scenario, the first wakeup instruction includes information about a double-tap-to-wake module.

It should be noted that, in an implementation scenario related to this disclosure, the sensor hub reports magnetometer data only in a process in which the electronic device is switched from a folded state to an unfolded state, or is switched from an unfolded state to a folded state. Therefore, a reporting frequency of the magnetometer data is relatively low, and power consumption of listening to the magnetometer data is also relatively low. Based on this, the electronic device in this disclosure may continuously listen to the magnetometer data. Therefore, after receiving the screen-on trigger signal, the electronic device can determine the first target screen based on the magnetometer data.

Further, in this implementation, when the electronic device determines the first target screen based on the location data or the magnetometer data, power consumption is low, and duration from a moment for receiving the screen-on trigger signal to a moment for lighting up the first target screen is relatively short, so that the electronic device can instantly light up the screen in response to the screen-on trigger signal, and user experience can be improved.

Further, in some embodiments, the electronic device 100 may enable the high-power sensor after receiving the screen-on trigger signal. With reference to the embodiment shown in FIG. 5A, after receiving a wakeup instruction, the display mode processing module may trigger the high-power sensor to be enabled. For example, after receiving the first wakeup instruction or the second wakeup instruction, the display mode processing module may send an instruction for enabling the high-power sensor to the sensor service module, and the sensor service module, for example, triggers the high-power sensor to be enabled. In some other embodiments, the electronic device 100 may enable the high-power sensor after controlling the first target screen to be lit up. With reference to the embodiment shown in FIG. 5A, after sending the first display mode data to the display management module, the display mode processing module may send an instruction for enabling the high-power sensor to the sensor service module.

In the method 10, the screen-on trigger signal provides a limited amount of data, and the user may change a posture of the electronic device. Therefore, in some implementation scenarios, the first target screen may not be a screen that the user expects to be lit up. Based on this, after enabling the high-power sensor, the electronic device may determine a posture of the electronic device by using the high-power sensor, then determine a screen to be lit up based on the posture of the electronic device, to obtain a second target screen, and further determine whether the second target screen is the same as the first target screen. If the second target screen is the same as the first target screen, it indicates that the first target screen is a screen that the user expects to be lit up, and the first target screen is kept lit up. If the second target screen is different from the first target screen, it indicates that the first target screen is not a screen that the user expects to be lit up, and the electronic device switches the lit-up screen from the first target screen to the second target screen. The second target screen is a first screen, a second screen, or a screen obtained by combining the first screen and the second screen. This process is referred to as "lit-up screen correction" in this embodiment.

For example, the electronic device may determine a posture of the electronic device based on sensor data determined by the high-power sensor, and then determine the to-be-lit-up second target screen based on the posture. If the second target screen is different from the first target screen, the electronic device switches a to-be-lit-up from the first target screen to the second target screen. If the second target screen is the same as the first target screen, the electronic device keeps a screen that is currently lit up in an on state.

It can be learned that, in this implementation, after controlling the first target screen to be lit up, the electronic device can further correct the lit-up screen in time based on the posture determined by the high-power sensor, to accurately control a screen that matches a user operation to be lit up, so that user experience can be improved.

For example, the sensor data determined by the high-power sensor may also be referred to as posture sensor data. For example, the posture sensor data may be expressed as {Gxm, Gym, Gzm, Gxs, Gys, Gzs, included angle}, where "Gxm" means an increment of the first screen in an x direction. "Gym" means an increment of the first screen in a y direction. "Gzm" means an increment of the first screen in a z direction. "Gxs" means an increment of the second screen in an x direction. "Gys" means an increment of the second screen in a y direction. "Gzs" means an increment of the second screen in a z direction. The "included angle" is an included angle between the first screen and the second screen.

Further, the electronic device may determine an initial posture of the electronic device based on the posture sensor data, and then determine a posture of the electronic device based on the initial posture and a user contact status. The initial posture is at least one of the following: unfolded, folded, placed with the first screen facing the user, and placed with the second screen facing the user. The user contact status is at least one of the following: contacting the first screen and contacting the second screen. The posture of the electronic device is at least one of the following: unfolded, folded, placed with the first screen facing the user, placed with the second screen facing the user, held with the first screen facing the user, or held with the second screen facing the user.

For example, when the posture of the electronic device is unfolding, the to-be-lit-up screen is a large screen. When the posture of the electronic device is folding, the to-be-lit-up screen is the first screen. When the electronic device is placed with the first screen facing the user, the to-be-lit-up screen is the first screen. When the electronic device is placed with the second screen facing the user, the to-be-lit-up screen is the second screen. When the electronic device is held with the first screen facing the user, the to-be-lit-up screen is the first screen. When the electronic device is held with the second screen facing the user, the to-be-lit-up screen is the second screen.

In some embodiments, the electronic device may determine the second target screen based on a posture. In some other embodiments, the electronic device may determine at least two postures of the electronic device, and then the electronic device may detect a quantity of consecutive occurrences of a same posture in the at least two postures. When the quantity of consecutive occurrences of the same posture is greater than half of a total quantity of the at least two postures, the electronic device determines the second target screen based on the same posture.

For example, in some embodiments, the electronic device may invoke the high-power sensor to determine postures within a preset time period, to obtain at least two postures. The preset time period is, for example, 250 ms. In some other embodiments, the electronic device may invoke the high-power sensor to determine to obtain a preset quantity of gestures, where the preset quantity is, for example, 5.

Figure 5B:
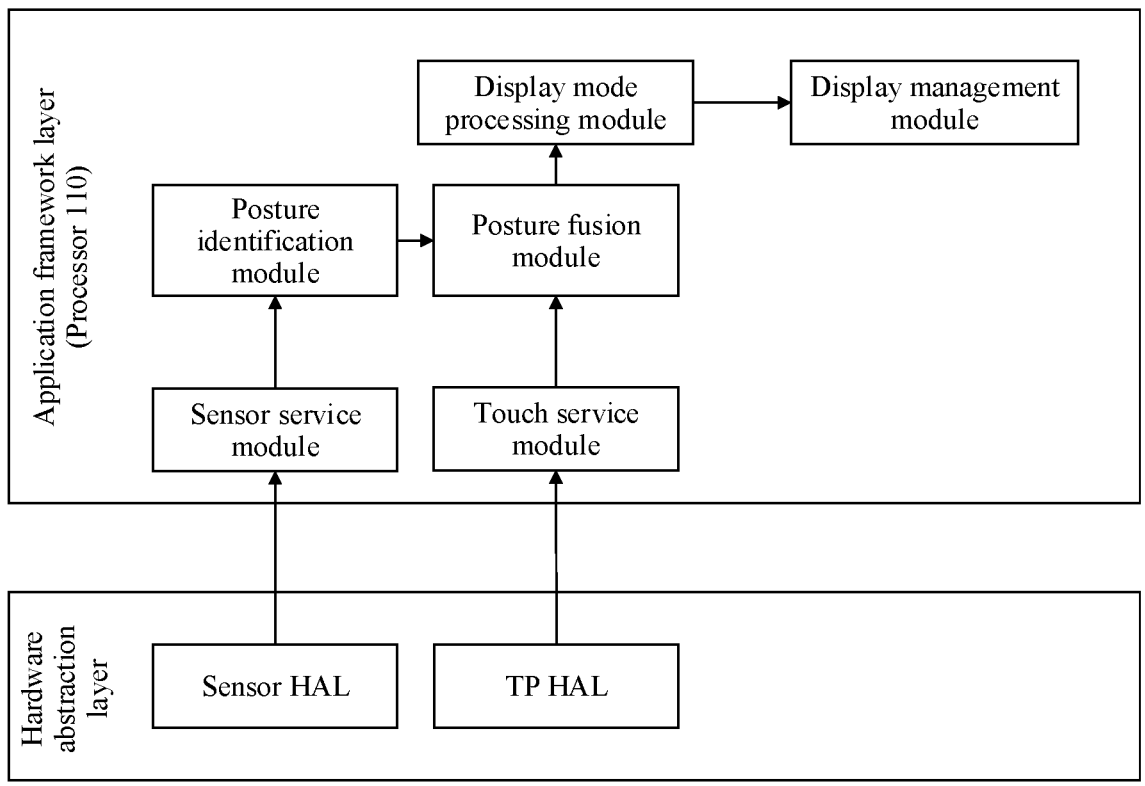
FIG. 5B is a schematic diagram of an example architecture of a screen-on control system according to an embodiment of this disclosure.

With reference to a screen-on control system 202 shown in FIG. 5B, the following describes an example implementation process of lit-up screen correction from a perspective of an electronic device.

The screen-on control system 202 shown in FIG. 5B includes an FWK layer and a HAL. The FWK layer includes a display mode processing module, a display management module, a touch service module, a sensor service module, a posture identification module, and a posture fusion module. The HAL includes a TP HAL and a sensor HAL. It should be understood that the screen-on control system 202 further includes an application layer and a hardware module (not shown in FIG. 5B). The application layer and the hardware module are the same as those in the embodiments shown in FIG. 2B and FIG. 5A. Details are not described herein again. In this embodiment, a high-power sensor includes, for example, an acceleration sensor and a gyroscope sensor.

After the electronic device enables functions of the acceleration sensor and the gyroscope sensor, the sensor hub collects gyroscope data and acceleration data, and then fuses the gyroscope data and the acceleration data to obtain posture sensor data. Then, the sensor hub reports the posture sensor data to the posture identification module by using the sensor HAL and the sensor service module. The posture identification module determines an initial posture of the electronic device based on the posture sensor data, and then transmits the initial posture to the posture fusion module. At the same time, the capacitive touchscreen collects touch operation data of the user, and then transmits the touch operation data to the touchscreen abstraction layer. The touchscreen abstraction layer parses the touch operation data to obtain a user contact status, and then reports the user contact status to the posture fusion module by using the touch service module. The posture fusion module determines a posture of the electronic device based on the initial posture and the user contact status, and then reports the posture to the display mode processing module.

In some embodiments, the display mode processing module may obtain, for example, five postures. Then, the display mode processing module detects whether at least three same postures consecutively occur in the five postures. If three or more same postures consecutively occur in the five postures, the display mode processing module determines a second target screen based on the consecutively appearing postures. Then, the display mode processing module detects whether the second target screen is the same as a first target screen. If the second target screen is different from the first target screen, the display mode processing module switches a to-be-lit-up screen from the first target screen to the second target screen. If a quantity of postures that consecutively occur in the five postures is less than or equal to 2, it indicates that the posture of the electronic device is being changed, and the display mode processing module may continue to obtain the posture of the electronic device.

For example, with reference to the embodiment shown in FIG. 3H, the initial state of the electronic device is a standby state, the first screen and the second screen of the electronic device are in a screen-off state, and the detection functions of the acceleration sensor and the gyroscope sensor of the electronic device are both in a disabled state. An included angle between the first screen and the second screen is, for example, 27 degrees. After the user presses a power button, the display mode processing module obtains magnetometer data from the sensor service module, determines, for example based on the magnetometer data, that the electronic device is in an unfolded state, and determines that the first target screen is a large screen. Further, the display mode processing module generates first display mode data that includes information about the large screen, and then transmits the first display mode data to the display management module. The display management module controls the large screen to be lit up in response to the button pressing operation of the user.

Further, after the user presses the power button, the display mode processing module further enables the detection functions of the acceleration sensor and the gyroscope sensor. The sensor hub may collect acceleration data and gyroscope data, and then fuses the acceleration data and the gyroscope data to obtain posture sensor data. Then, the sensor hub reports the posture sensor data to the posture identification module by using the sensor service module. In this embodiment, the posture sensor data includes data of a 27-degree included angle between the first screen and the second screen.

For example, from a perspective of the user, when there is a 27-degree included angle between the first screen and the second screen, the electronic device is closer to a folded state. Therefore, in this embodiment, the initial posture determined by the posture identification module is, for example, a folded state. In addition, in this embodiment, a user contact status is, for example, not contacting. Correspondingly, the posture fusion module determines that the posture of the electronic device is a folded state. Further, the posture fusion module reports the posture to the display mode processing module. Then, the display mode processing module determines, based on the folded state of the electronic device, that the second target screen is the first screen. Based on this, after determining that the first screen is different from the large screen, the display mode processing module generates second display mode data, where the second display mode data includes information about the first screen. Then, the display mode processing module transmits the second display mode data to the display management module. In this way, the display mode processing module switches the lit-up screen from the large screen to the first screen, to correct the lit-up screen.

It may be understood that the foregoing embodiments and operation scenarios of this disclosure are intended to describe the technical solutions of this disclosure more clearly, and do not constitute any limitation on the technical solutions provided in this disclosure. A person of ordinary skill in the art may learn that, as a new application scenario emerges, the technical solutions provided in embodiments of this disclosure are also applicable to a similar technical problem.

In conclusion, when the high-power sensor is disabled, the low-power sensor may detect the screen-on trigger signal. Then, the electronic device may determine a to-be-lit-up screen based on the screen-on trigger signal, and control the to-be-lit-up screen to be lit up, so that the screen can be lit up in time in response to trigger. Further, after receiving the screen-on trigger signal, the electronic device may further enable the high-power sensor. Further, the electronic device may obtain a posture of the electronic device determined by the high-power sensor. Then, the electronic device verifies, based on the posture of the electronic device, whether the lit-up screen matches the screen-on trigger signal. If the lit-up screen does not match the screen-on trigger signal, the electronic device switches the lit-up screen to a screen that matches the screen-on trigger signal. It can be learned that in the implementations of this disclosure, when the high-power sensor is disabled, the electronic device can control the screen to be lit up in time in response to the screen-on trigger signal. Then, the electronic device can further correct the lit-up screen in time, so that it can be ensured that the screen that matches the screen-on trigger signal is lit up, and user experience can be improved.

The foregoing embodiments describe the solutions of the screen-on control method provided in this disclosure from perspectives of a hardware structure, a software architecture, and actions performed by software and hardware of the electronic device. A person skilled in the art should be easily aware that, with reference to the processing steps, such as obtaining posture data and controlling a screen to be lit up, described in embodiments disclosed in this specification, this disclosure can be implemented more than by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this disclosure.

For example, the electronic device 100 may implement the corresponding functions by using function modules. In some embodiments, the electronic device may include a processing module, a receiving module, and a display module. The receiving module may be configured to perform receiving a screen-on trigger signal in any embodiment shown in FIG. 4. The processing module may be configured to perform operations of determining a target screen and controlling a screen to be lit up in any embodiment shown in FIG. 4. The display module may be configured to perform, in response to control of the processing module, an operation of lighting up the target screen. For specific content, refer to related descriptions of the electronic device in the embodiment corresponding to FIG. 4. Details are not described herein again.

It may be understood that the foregoing function modules are only a representation form, and there is a correspondence between the function modules and the modules at the software layers in FIG. 2B, FIG. 5A, and FIG. 5B. Correspondences between the foregoing function modules and the modules in FIG. 2B, FIG. 5A, and FIG. 5B may be determined based on operations performed by the modules. Details are not described herein again.

Figure 6:
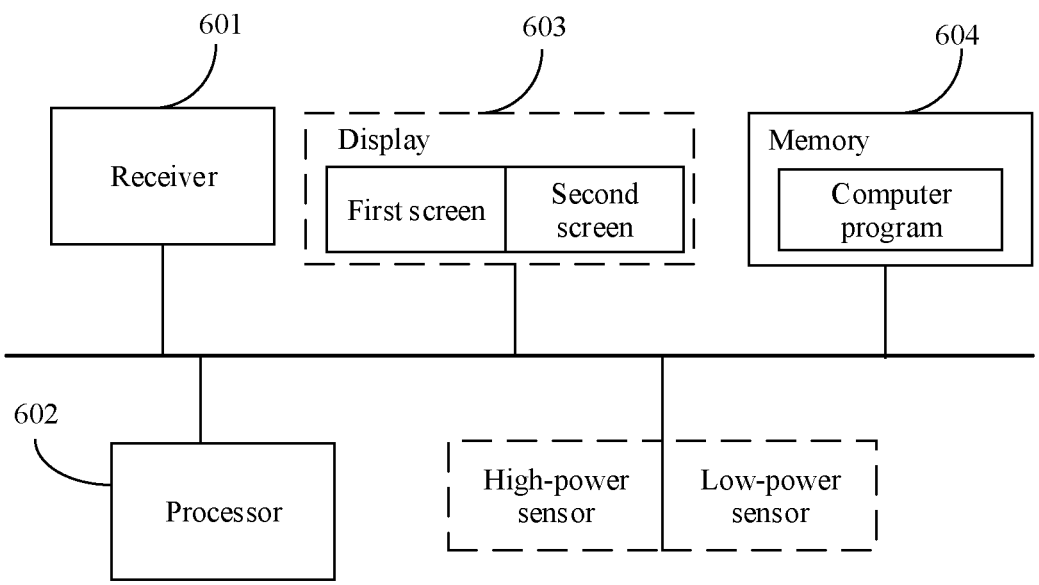
FIG. 6 is a schematic diagram of an example structure of an electronic device according to an embodiment of this disclosure.

It may be understood that the foregoing module division is only logical function division. In actual implementation, the function of the receiving module may be integrated into a receiver for implementation, the function of the processing module may be integrated into a processor for implementation, and the function of the display module may be integrated into a display for implementation. As shown in FIG. 6, the electronic device 60 includes a receiver 601, a processor 602, a display 603, and a memory 604. The electronic device 60 further includes a high-power sensor and a low-power sensor. The high-power sensor includes a sensor configured to detect a posture of the electronic device 60, and the low-power sensor includes a sensor configured to detect a screen-on trigger signal. The display 603 includes the first screen and the second screen. The memory 604 may be configured to store a program/code pre-installed on the electronic device 60, or may store code or the like used for execution by the processor 602.

The receiver 601 may be configured to perform receiving a screen-on trigger signal in any embodiment shown in FIG. 4. The low-power sensor in the electronic device 60 may perform detecting the screen-on trigger signal in any embodiment shown in FIG. 4. After being enabled, the high-power sensor in the electronic device 60 may determine a posture in any embodiment shown in FIG. 4. The processor 602 may be configured to perform operations of determining a target screen and controlling a screen to be lit up in any embodiment shown in FIG. 4. The display 603 is configured to light up at least one of the first screen and the second screen in response to control of the processor 602.

For example, the receiver 601 is configured to receive a screen-on trigger signal, where the screen-on trigger signal is from the low-power sensor or the processor 602. The processor 602 may be configured to determine a to-be-lit-up first target screen based on the screen-on trigger signal, where the first target screen is the first screen, the second screen, or a screen obtained by combining the first screen and the second screen. The processor 602 is further configured to control the first target screen to be lit up.

For specific content, refer to related descriptions of the electronic device in the embodiment corresponding to FIG. 4. Details are not described herein again.

In specific implementation, corresponding to the electronic device, an embodiment of this disclosure further provides a computer storage medium. The computer storage medium disposed in any device may store a program. When the program is executed, some or all of the steps in the embodiments of the screen-on control method provided in FIG. 4 may be performed. A storage medium in any device may be a magnetic disk, an optical disc, a read-only memory (ROM), a RAM, or the like.

In embodiments of this disclosure, the receiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of the CPU and the NP. The processor may further include a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The memory may include a volatile memory, for example, a RAM, the memory may include a non-volatile memory, for example, a ROM, a flash memory, a hard disk drive (HDD), or a solid-state drive (SSD), and the memory may further include a combination of the foregoing types of memories.

FIG. 6 may further include a bus interface. The bus interface may include any quantity of interconnected buses and bridges, and further links various circuits of one or more processors represented by the processor and memories represented by the memory. The bus interface may further link together various other circuits, such as a peripheral device, a voltage regulator, and a power management circuit. This is well known in the art, and therefore is not further described in this specification. The bus interface provides an interface. The transceiver provides a unit configured to communicate with various other devices on a transmission medium. The processor is responsible for bus architecture management and general processing. The memory may store data used when the processor performs an operation.

A person skilled in the art may further understand that various illustrative logical blocks and steps that are listed in embodiments of this disclosure may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of embodiments of this disclosure.

The various illustrative logical units and circuits described in embodiments of this disclosure may implement or operate the described functions by using a general-purpose processor, a digital signal processor, an ASIC, an FPGA or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

The steps of the methods or algorithms described in embodiments of this disclosure may be directly embedded into hardware, a software unit executed by a processor, or a combination thereof. The software unit may be stored in a RAM, a flash memory, a ROM, an erasable programable ROM (EPROM), an electrically EPROM (EEPROM), a register, a hard disk, a removable magnetic disk, a compact disc (CD) ROM (CD-ROM), or a storage medium of any other form in the art. For example, the storage medium may connect to a processor, so that the processor can read information from the storage medium and write information to the storage medium. Optionally, the storage medium may further be integrated into the processor. The processor and the storage medium may be arranged in the ASIC, and the ASIC may be arranged in an electronic device. Optionally, the processor and the storage medium may be arranged in different components of the electronic device.

It should be understood that sequence numbers of the foregoing processes do not mean execution sequences in various embodiments of this disclosure. The execution sequences of the processes need to be determined based on functions and internal logic of the processes, and should not be construed as any limitation on the implementation processes of the embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, all or some of the procedures or functions in this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or packet center to another website, computer, server, or packet center in a wired (for example, a coaxial cable, an optical fiber, or a digital subscriber line (DSL)) or wireless (for example, infrared, radio, or microwave) manner. The computer-readable storage medium may be any usable medium accessible by a computer, or a packet storage device, such as a server or a packet center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (solid state disk (SSD)), or the like.

The parts in this specification are all described in a progressive manner. For same or similar parts in embodiments, refer to these embodiments. Each embodiment focuses on a difference from other embodiments. Especially, apparatus and system embodiments are basically similar to method embodiments, and therefore are described briefly, for related parts, refer to partial descriptions in the method embodiment.

Although some preferred embodiments of this disclosure have been described, persons skilled in the art can make changes and modifications to these embodiments once they learn the basic concept. Therefore, the following claims are intended to be construed as to cover the preferred embodiments and all changes and modifications falling within the scope of this disclosure.

It is clear that a person skilled in the art can make various modifications and variations to this disclosure without departing from the spirit and scope of this disclosure. This disclosure is intended to cover the modifications and variations of this disclosure provided that they fall within the scope of the following claims and equivalent technologies of this disclosure.

What is claimed is:

1. A screen-on control method implemented by an electronic device, wherein the screen-on control method comprises:
   receiving, from a low-power sensor of the electronic device when the low-power sensor is in an enabled state or from a processor of the electronic device, a screen-on trigger signal;
   enabling a high-power sensor of the electronic device, wherein the high-power sensor is in a disabled state;
   controlling a first target screen of the electronic device to be lit up, wherein the first target screen is based on the screen-on trigger signal, wherein the first target screen is a first screen of the electronic device, a second screen of the electronic device, or a third screen of the electronic device that is based on a combination of the first screen and the second screen;
   obtaining, using the high-power sensor, sensor data comprising first increments of the first screen in X, Y, and Z directions, second increments of the second screen in the X, Y, and Z directions, or an included angle between the first screen and the second screen;
   switching a to-be-lit-up screen from the first target screen to a second target screen when the second target screen is different from the first target screen, wherein the second target screen is any one of the first screen, the second screen, or the third screen, wherein the second target screen is based on a posture of the electronic device, wherein the posture of electronic device is based on the sensor data; and
   maintaining a lit screen that is currently lit up in an on state when the second target screen is the same as the first target screen.

2. The screen-on control method of claim 1, further comprising selecting, based on first orientation data of the first screen and second orientation data of the second screen, that a screen facing a user is the first target screen.

3. The screen-on control method of claim 2, wherein the screen-on trigger signal comprises the first orientation data and the second orientation data.

4. The screen-on control method of claim 1, wherein the third screen is the first target screen when a status of the electronic device is an unfolded state, wherein the status is based on relative locations of the first screen and the second screen according to magnetometer data.

5. The screen-on control method of claim 1, wherein the first screen is the first target screen when a status of the electronic device is a folded state, wherein the status is based on relative locations of the first screen and the second screen according to magnetometer data.

6. The screen-on control method of claim 5, wherein the status is the folded state, and wherein a screen indicated by location data is the first target screen.

7. The screen-on control method of claim 1, wherein the posture of the electronic device comprises at least one of: unfolded, folded, placed with the first screen facing a user, placed with the second screen facing the user, held with the first screen facing the user, or held with the second screen facing the user.

8. The screen-on control method of claim 1,
   wherein an initial posture of the electronic device is based on the sensor data, wherein the initial posture comprises at least one of: unfolded, folded, placed with the first screen facing a user, or placed with the second screen facing the user, and
   wherein the screen-on control method further comprises determining, using the low-power sensor, a user contact status comprising at least one of:
      contacting the first screen or contacting the second screen; or
      determining, based on the initial posture and the user contact status, the posture of the electronic device.

9. The screen-on control method of claim 1, wherein the second target screen is further based on:
- detecting a quantity of consecutive occurrences of a same posture in at least one posture of the electronic device; and
- determining, based on the same posture, the second target screen when the quantity of consecutive occurrences is greater than half of a total quantity of the at least one posture of the electronic device.

10. An electronic device comprising:
a processor;
a display comprising:
  a first screen; and
  a second screen;
a low-power sensor coupled to the display, and configured to detect a screen-on trigger signal when in an enabled state;
a high-power sensor coupled to the display, in a disabled state, and configured to detect a posture of the electronic device; and
a receiver coupled to the display and the low-power sensor and configured to receive, from the low-power sensor or the processor, the screen-on trigger signal,
wherein the processor is coupled to the display, the receiver, the low-power sensor, and the high-power sensor, wherein the processor is configured to:
  enable the high-power sensor after the receiver receives the screen-on trigger signal;
  control a first target screen to be lit up, wherein the first target screen is based on the screen-on trigger signal, wherein the first target screen is the first screen, the second screen, or a third screen of the electronic device that is based on a combination of the first screen and the second screen;
  obtain, after controlling the first target screen to be lit up, and using the high-power sensor, sensor data comprising first increments of the first screen in X, Y, and Z directions, second increments of the second screen in the X, Y, and Z directions, or an included angle between the first screen and the second screen;
  switch a to-be-lit-up screen from the first target screen to a second target screen when the second target screen is different from the first target screen, wherein the second target screen is any one of the first screen, the second screen, or the third screen, wherein the second target screen is based on the posture of the electronic device; and
  maintain a lit screen that is currently lit up in an on state when the second target screen is the same as the first target screen.

11. The electronic device of claim 10, wherein the processor is further configured to select, based on first orientation data of the first screen and second orientation data of the second screen, that a screen facing a user is the first target screen.

12. The electronic device of claim 11, wherein the screen-on trigger signal comprises the first orientation data and the second orientation data.

13. The electronic device of claim 10, wherein
the third screen is the first target screen when status of the electronic device is an unfolded state, wherein the status is based on relative locations of the first screen and the second screen according to magnetometer data, and
  wherein the first screen is the first target screen when the status of the electronic device is a folded state.

14. The electronic device of claim 13, wherein when the status of the electronic device is the folded state, a screen indicated by location data is the first target screen.

15. The electronic device of claim 10, wherein the posture of the electronic device comprises at least one of: unfolded, folded, placed with the first screen facing a user, placed with the second screen facing the user, held with the first screen facing the user, or held with the second screen facing the user.

16. The electronic device of claim 10,
wherein an initial posture of the electronic device is based on the sensor data, wherein the initial posture comprises at least one of: unfolded, folded, placed with the first screen facing a user, or placed with the second screen facing the user, and
wherein the processor is further configured to determine, using the low-power sensor, a user contact status comprising at least one of:
  contacting the first screen or contacting the second screen; or
  determine, based on the initial posture and the user contact status, the posture of the electronic device.

17. The electronic device of claim 10, wherein the processor is further configured to:
- detect a quantity of consecutive occurrences of a same posture in at least one posture of the electronic device; and
- determine, based on the same posture, the second target screen when the quantity of consecutive occurrences is greater than half of a total quantity of the at least one posture of the electronic device.

18. A computer program product comprising computer-executable instructions that are stored on a non-transitory computer-readable storage medium and that, when executed by a processor, cause an electronic device to:
  receive, from a low-power sensor of the electronic device or the processor, a screen-on trigger signal, wherein the low-power sensor is in an enabled state and is configured to detect the screen-on trigger signal;
  enable a high-power sensor of the electronic device, wherein the high-power sensor is in a disabled state;
  control a first target screen of the electronic device to be lit up, wherein the first target screen is based on the screen-on trigger signal, wherein the first target screen is a first screen of the electronic device, a second screen of the electronic device, or a third screen of the electronic device that is based on a combination of the first screen and the second screen;
  obtain, using the high-power sensor, sensor data comprising first increments of the first screen in X, Y, and Z directions, second increments of the second screen in the X, Y, and Z directions, or an included angle between the first screen and the second screen;
  switch a to-be-lit-up screen from the first target screen to a second target screen when the second target screen is different from the first target screen, wherein the second target screen is any one of the first screen, the second screen, or the third screen, wherein the second target screen is based on a posture of the electronic device, wherein the posture of electronic device is based on the sensor data; and
  maintain a lit screen that is currently lit up in an on state when the second target screen is the same as the first target screen.

19. The computer program product of claim 18, wherein the computer-executable instructions further cause the electronic device to select, based on first orientation data of the first screen and second orientation data of the second screen, that a screen facing a user is the first target screen.

20. The computer program product of claim 18,
wherein the third screen is the first target screen when a status of the electronic device is an unfolded state, wherein the status is based on relative locations of the first screen and the second screen according to magnetometer data.

\* \* \* \* \*